US012711185B1

(12) United States Patent
Jhamtani et al.

(10) Patent No.: US 12,711,185 B1
(45) Date of Patent: Aug. 18, 2026

(54) AUTOMATED OPTIMIZATION FRAMEWORK FOR ACCURATE EXTRACTION OF TABULAR DATA FROM DIVERSE PDF DOCUMENTS USING LARGE LANGUAGE MODELS

(71) Applicant: JPMorgan Chase Bank, N.A., New York, NY (US)

(72) Inventors: Aashish Jhamtani, Bangalore (IN); Suketa Dave, Bangalore (IN); Veer Daksh Agarwal, Muzaffarnagar (IN)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 19/180,843

(22) Filed: Apr. 16, 2025

(51) Int. Cl.
*G06F 16/93* (2019.01)
*G06F 16/245* (2019.01)

(52) U.S. Cl.
CPC ............ *G06F 16/93* (2019.01); *G06F 16/245* (2019.01)

(58) Field of Classification Search
CPC ................................ G06F 16/93; G06F 16/245
See application file for complete search history.

(56) References Cited

U.S. PATENT DOCUMENTS 11,599,711 B2 * 3/2023 Zhong .................. G06F 40/157
11,798,183 B2 * 10/2023 Zhu .......................... G06T 7/90
2022/0180044 A1 * 6/2022 Zhong .................. G06F 40/157
2022/0292699 A1 * 9/2022 Zhu ...................... G05D 1/0214
2024/0419904 A1 * 12/2024 Wu ........................ G06N 3/045
2025/0117833 A1 * 4/2025 Sahu ..................... G06F 40/174
2025/0148278 A1 * 5/2025 Long ...................... G06N 3/091

* cited by examiner

*Primary Examiner* — Angelica Ruiz
(74) *Attorney, Agent, or Firm* — Wood IP, LLC; Theodore A. Wood

(57) ABSTRACT

The disclosure relates to a self-correcting artificial intelligence (AI) framework that receives PDF documents for extracting and validating tabular data. The framework includes a data extractor module that reconstructs tabular data into a structured dataframe using a data extraction algorithm. A comparator module validates the extracted data by querying the dataframe and generating a reconstruction loss calculation. An error correction module iteratively adjusts the data extractor module's parameters to minimize reconstruction loss. An adaptive learner module continuously adapts the framework to new data, monitoring a dual-model architecture comprising a primary large language model (LLM) module and a secondary model. The primary LLM module generates ground truth and synthetic data to train the secondary model, which determines the confidence level of the extracted data. The framework outputs final extracted data after validation and error correction, ensuring accurate representation of the original tabular content in the PDF documents.

20 Claims, 21 Drawing Sheets

300

400A

400B

400C

500A

500B

600A

UNAUDITED - See "Notice to Reader"

| | 2002 | 2001 |
|---|---|---|
| **ASSETS** | | |
| CURRENT | | |
| Cash | $ 11,552 | $ – |
| Accounts receivable | 42,970 | 50,595 |
| Deposits and prepaid expenses | 2,942 | 2,688 |
| Inventory | 159,144 | 156,657 |
| | 216,806 | 209,940 |
| PROPERTY, PLANT AND EQUIPMENT (Note 2) | 59,890 | 76,318 |
| INVESTMENTS | -- | 45,001 |
| | $ 276,496 | $ 331,259 |
| **LIABILITIES** | | |
| CURRENT | | |
| Bank overdraft | $ – | $ 9,474 |
| Bank loan | -- | 60,000 |
| Accounts payable and accrued liabilities | 82,053 | 91,343 |
| Long-term debt - current portion | 25,200 | – |
| Income tax payable | 14,387 | – |
| | 121,640 | 160,817 |
| DUE TO SHAREHOLDER (Note 3) | 51,591 | 231,791 |
| LONG-TERM DEBT (Note 4) | 86,100 | -- |
| | 259,331 | 392,608 |
| **SHAREHOLDER'S EQUITY** | | |
| STATED CAPITAL (Note 5) | 1 | 1 |
| RETAINED EARNINGS (DEFICIT) | 17,166 | (61,350) |
| | 17,167 | (61,349) |
| | $ 276,498 | $ 331,259 |

APPROVED

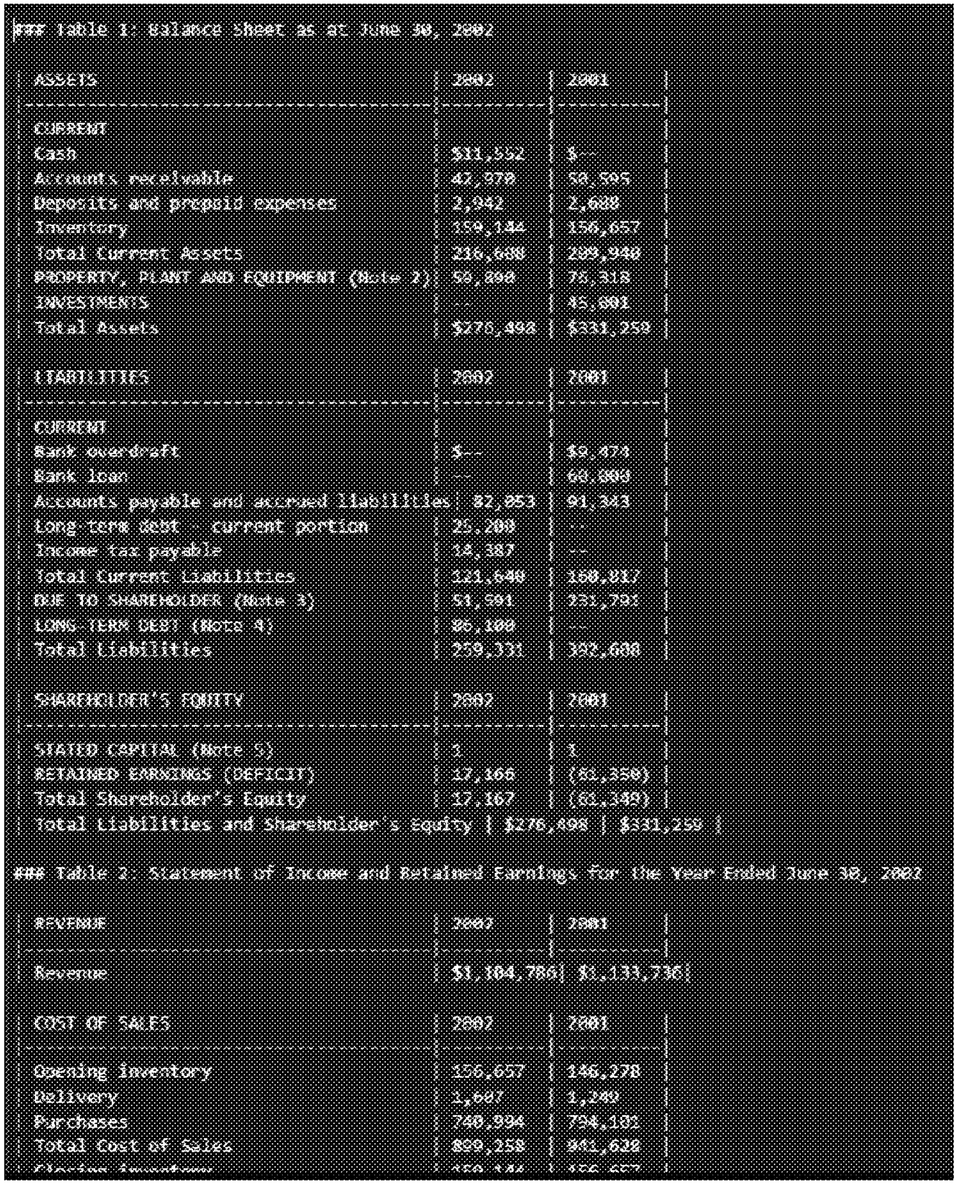

Table 1: Balance Sheet as at June 30, 2002

| ASSETS | 2002 | 2001 |
|---|---|---|
| CURRENT | | |
| Cash | $11,552 | $-- |
| Accounts receivable | 42,970 | 50,595 |
| Deposits and prepaid expenses | 2,942 | 2,688 |
| Inventory | 159,144 | 156,657 |
| Total Current Assets | 216,608 | 209,940 |
| PROPERTY, PLANT AND EQUIPMENT (Note 2) | 59,890 | 76,318 |
| INVESTMENTS | -- | 45,001 |
| Total Assets | $276,498 | $331,259 |

| LIABILITIES | 2002 | 2001 |
|---|---|---|
| CURRENT | | |
| Bank overdraft | $-- | $9,474 |
| Bank loan | -- | 60,000 |
| Accounts payable and accrued liabilities | 82,053 | 91,343 |
| Long-term debt - current portion | 25,200 | -- |
| Income tax payable | 14,387 | -- |
| Total Current Liabilities | 121,640 | 160,817 |
| DUE TO SHAREHOLDER (Note 3) | 51,591 | 231,791 |
| LONG-TERM DEBT (Note 4) | 86,100 | -- |
| Total Liabilities | 259,331 | 392,608 |

| SHAREHOLDER'S EQUITY | 2002 | 2001 |
|---|---|---|
| STATED CAPITAL (Note 5) | 1 | 1 |
| RETAINED EARNINGS (DEFICIT) | 17,166 | (61,350) |
| Total Shareholder's Equity | 17,167 | (61,349) |
| Total Liabilities and Shareholder's Equity | $276,498 | $331,259 |

Table 2: Statement of Income and Retained Earnings for the Year Ended June 30, 2002

| REVENUE | 2002 | 2001 |
|---|---|---|
| Revenue | $1,104,786 | $1,133,736 |

| COST OF SALES | 2002 | 2001 |
|---|---|---|
| Opening inventory | 156,657 | 146,278 |
| Delivery | 1,607 | 1,249 |
| Purchases | 740,994 | 794,101 |
| Total Cost of Sales | 899,258 | 941,628 |
| Closing inventory | 159,144 | 156,657 |

| | Questions | Values | Relevant Table | Correct/Incorrect |
|---|---|---|---|---|
| 0 | Dividends for 2002? | $-- | Table 3: Statement of Cash Flow for the Year ... | Yes |
| 1 | Income Tax Expense for 2001 | 8,810 | Table 2 | No |
| 2 | Current Inventory Assets for 2002 | 156,657 | Table 1 | No |
| 3 | Income Tax Expense for 2002 | 92,903 | Table 2 | No |
| 4 | Operating Expense on Bad debts for 2002 | 179 | Table 4 | No |
| 5 | Operating Expenses on Insurance for 2001 | 4,779 | Table 4 | No |
| 6 | Net Income for 2002 | 92,903 | Table 2 | No |
| 7 | Current Bank Loan Liability for 2002 | $-- | Table 1 | Yes |
| 8 | Net Income before tax for 2002 | 14,387 | Table 2 | No |
| 9 | Gross Profit for 2002? | $364,672 | Table 2: Statement of Income and Retained Ear... | Yes |
| 10 | Net Income before tax for 2002? | $92,903 | Table 2: Statement of Income and Retained Ear... | Yes |
| 11 | Net Income for 2002 | 8,810 | Table 2 | No |
| 12 | Gross Profit for 2002 | 899,258 | Table 2 | No |
| 13 | Income Tax Expense for 2002? | $14,387 | Table 2: Statement of Income and Retained Ear... | Yes |
| 14 | Operating Expense on Travel for 2002 | 3,212 | Table 4 | No |
| 15 | Long Term Debt Liabilities for 2002 | 51,591 | Table 1 | No |
| 16 | Revenue for 2001 | 899,258 | Table 2 | No |
| 17 | Cost of sales for Purchases in 2002? | $740,994 | Table 2: Statement of Income and Retained Ear... | Yes |
| 18 | Current Bank Loan Liability for 2001 | $-- | Table 1 | No |
| 19 | Cash Resources (Deficiency) - End of Year 2002 | $-- | Table 3 | No |

Figure 6D:
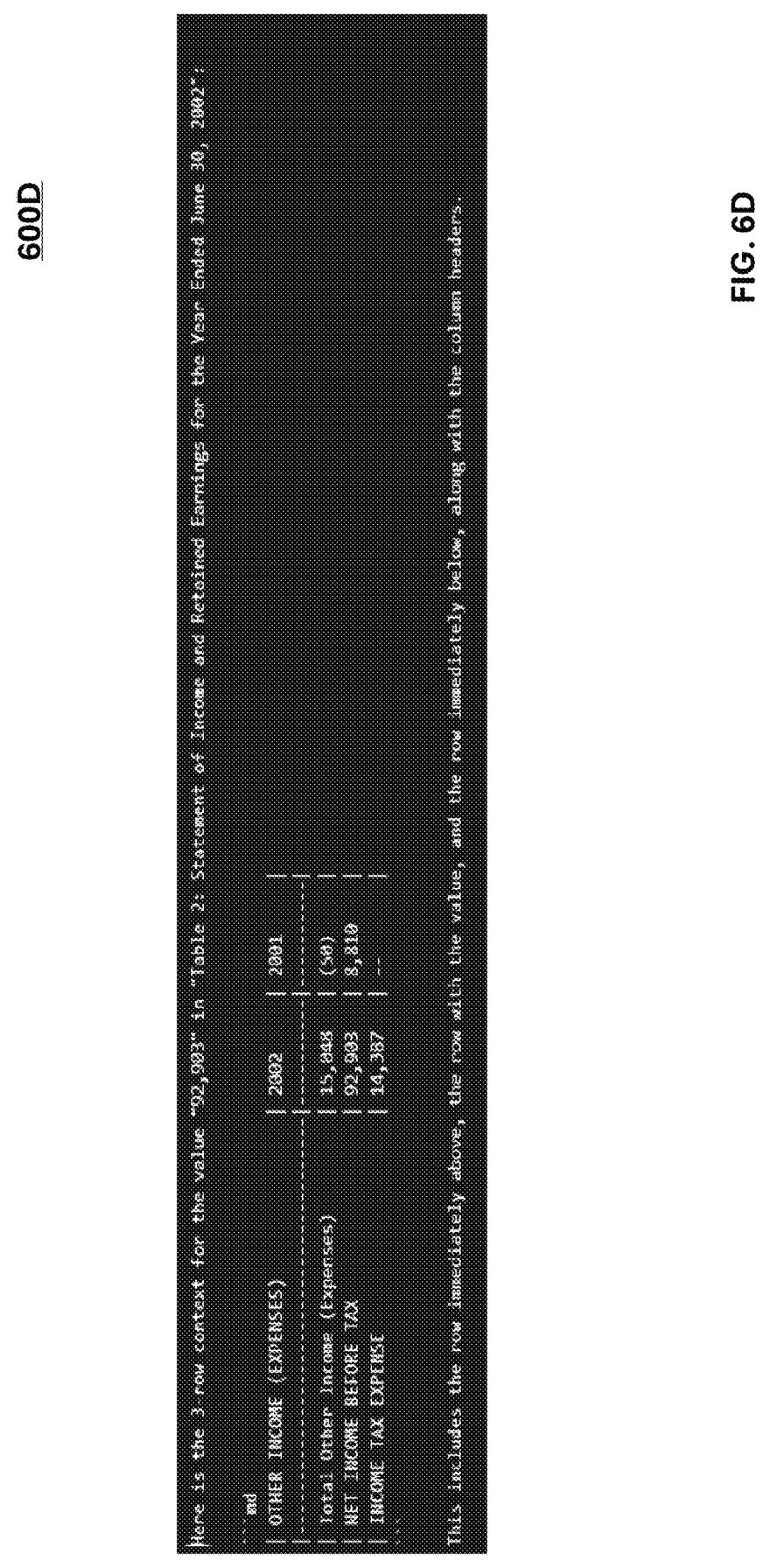

Here is the 3-row context for the value "92,903" in "Table 2: Statement of Income and Retained Earnings for the Year Ended June 30, 2002":

```md
| OTHER INCOME (EXPENSES)             | 2002      | 2001      |
|-------------------------------------|-----------|-----------|
| Total Other Income (Expenses)       | 15,048    | (50)      |
| NET INCOME BEFORE TAX               | 92,903    | 8,810     |
| INCOME TAX EXPENSE                  | 14,387    | --        |
```

This includes the row immediately above, the row with the value, and the row immediately below, along with the column headers.

| embed_question | embed_value | embed_context |
| --- | --- | --- |
| [-0.37431735, 0.22655903, 0.042099204, 0.28912... | [1.3397168, -0.33368203, -0.3438351, 0.5778699... | [-0.33247396, 0.27529818, 0.0696743, 0.2111301... |
| [-0.37431735, 0.22655903, 0.042099204, 0.28912... | [1.2475611, -0.30058226, -0.4030437, 0.5969677... | [0.020751959, 0.10297498, 0.19843856, 0.241749... |
| [-0.37431735, 0.22655903, 0.042099204, 0.28912... | [-0.51228493, -0.06910918, -0.09527851, 0.1386... | [-0.34121546, 0.3194694, 0.09238164, 0.1450723... |
| [-0.97680753, -0.24593128, 0.045646183, -0.134... | [-0.4702021, -0.024256246, 0.14688216, 0.46934... | [-0.27672926, 0.23287807, 0.1832852, 0.2134126... |
| [-0.97680753, -0.24593128, 0.045646183, -0.134... | [-0.23848845, 0.040426053, 0.10422034, 0.52267... | [1.0226016, -0.06464301, 0.14100538, 0.6531396... |
| ... | ... | ... |
| [0.9849417, -0.040426925, -0.042713914, 0.1689... | [0.88651186, 0.30835044, -0.39613098, 0.444723... | [0.20537521, -0.021647159, 0.3160292, 0.372962... |
| [1.0769722, -0.13163672, 0.09823517, 0.3325557... | [0.79651994, 0.2821509, -0.29596245, 0.3079353... | [0.17589003, 0.08835063, 0.3757611, 0.42166245... |
| [0.9548798, -0.08832924, 0.030531028, 0.259782... | [0.70634955, 0.34711245, -0.36080942, 0.226680... | [0.22370955, -0.04339823, 0.2592784, 0.3125763... |
| [1.1069976, 0.032207172, 0.1530558, 0.2781832,... | [1.0362219, 0.21927205, -0.4329997, 0.35142317... | [0.11068903, 0.063645884, 0.19949378, 0.253299... |
| [1.3148301, -0.27758142, 0.12720583, 0.4341821... | [0.9508427, 0.24100055, -0.26364556, 0.2622707... | [0.32712463, -0.01408361, 0.3047688, 0.3173113... |

| embed_question_0 | embed_question_1 | embed_question_2 | embed_question_3 | embed_question_4 | embed_question_5 | embed_question_6 | embed_question_7 | embed_question_8 | embed_question_9 | ... | embed_context_758 | embed_context_759 | embe |
| --- | --- | --- | --- | --- | --- | --- | --- | --- | --- | --- | --- | --- | --- |
| -0.374317 | 0.226559 | 0.042099 | 0.289125 | -0.344010 | 0.119554 | -0.105678 | 0.715406 | -0.564141 | -0.049593 | ... | 0.949384 | 0.105892 | |
| -0.374317 | 0.226559 | 0.042099 | 0.289125 | -0.344010 | 0.119554 | -0.105678 | 0.715406 | -0.564141 | -0.049593 | ... | 1.015166 | 0.192183 | |
| -0.374317 | 0.226559 | 0.042099 | 0.289125 | -0.344010 | 0.119554 | -0.105678 | 0.715406 | -0.564141 | -0.049593 | ... | 0.999774 | -0.025031 | |
| -0.976808 | -0.245931 | 0.045646 | -0.134445 | 0.200420 | -0.015197 | 0.084231 | 0.235229 | -0.570966 | -0.633625 | ... | 1.090856 | 0.174135 | |
| -0.976808 | -0.245931 | 0.045646 | -0.134445 | 0.200420 | -0.015197 | 0.084231 | 0.235229 | -0.570966 | -0.633625 | ... | 0.858663 | 0.387139 | |
| ... | ... | ... | ... | ... | ... | ... | ... | ... | ... | ... | ... | ... | |
| 0.984942 | -0.040427 | -0.042714 | 0.168993 | -0.318913 | 0.044564 | 0.429094 | -0.217180 | 0.233093 | 0.034731 | ... | 1.246378 | 0.290607 | |
| 1.076972 | -0.131637 | 0.098235 | 0.332556 | 0.028521 | 0.085183 | 0.363606 | -0.246774 | 0.213615 | -0.060615 | ... | 1.087194 | 0.266915 | |
| 0.954880 | -0.088329 | 0.030531 | 0.259782 | -0.379807 | 0.358448 | 0.514593 | 0.019598 | 0.366365 | 0.057444 | ... | 1.189537 | 0.236652 | |
| 1.106998 | 0.032207 | 0.153056 | 0.278183 | -0.318939 | -0.031830 | 0.431856 | -0.187054 | 0.427256 | 0.104447 | ... | 1.078322 | 0.227410 | |
| 1.314830 | -0.277581 | 0.127206 | 0.434182 | -0.097053 | 0.351458 | 0.296135 | -0.190450 | 0.256169 | -0.129049 | ... | 1.051604 | 0.371863 | |

| | 2006 | | | | 2005 |
|---|---|---|---|---|---|
| | Unrestricted | Temporarily Restricted | Permanently Restricted | Total | Total |
| Support and Revenue | | | | | |
| Contributions | $ 428,376 | $ 1,252,827 | $ 684,577 | $ 2,365,580 | $ 4,505,264 |
| Donated services | 296,731 | - | - | 296,731 | 256,181 |
| Event revenue | 99,787 | 326,824 | - | 425,611 | 388,255 |
| Sponsorship | 172,500 | 22,590 | - | 195,090 | 248,000 |
| Investment income | 51,177 | 591,094 | - | 642,271 | 2,302,223 |
| Other revenues | 6,950 | 35,071 | - | 42,021 | 36,305 |
| Net assets released from restrictions | 2,602,266 | (2,602,266) | - | - | - |
| Total support and revenue | 3,657,779 | (375,852) | 684,577 | 3,967,384 | 7,770,833 |

| | 2006 | 2005 |
|---|---|---|
| Cash Flows from Operating Activities | | |
| Change in net assets | $ 186,404 | $ 4,141,713 |
| Adjustments to reconcile change in net assets to net cash provided by (used in) operating activities: | | |
| Donated property | - | (9,200) |
| Contributions received for endowment | (684,577) | (2,540,810) |
| Depreciation | 29,121 | 33,096 |
| Realized and unrealized losses (gains) on investments | 148,928 | (1,540,670) |
| Discount and allowance on promises to give | 212,090 | 119,596 |
| Donated securities | (117,452) | (62,034) |
| Loss (gain) on sale of assets | 8,572 | (19,936) |
| Changes in assets and liabilities | | |
| (increase) decrease in: | | |
| Receivables | 34,023 | 98,712 |
| Prepaid expenses | 8,823 | (9,790) |
| Promises to give | 903,489 | (2,125,155) |
| Increase (decrease) in: | | |
| Accounts payable and accrued expenses | 45,231 | 28,498 |
| Gift annuity | 255,499 | 446,792 |
| Deferred revenue | (77,079) | (88,082) |
| Net cash provided by (used in) operating activities | 953,072 | (1,561,198) |
| Cash Flows from Investing Activities | | |
| Proceeds from sale of property and equipment | - | 21,600 |
| Purchase of investments | (12,227,485) | (10,007,358) |
| Proceeds from sale of investments | 10,672,219 | 9,284,124 |
| Net cash (used in) investing activities | (1,555,266) | (701,434) |
| Cash Flows from Financing Activities | | |
| Contributions received for endowment | 684,577 | 2,540,810 |
| Net cash provided by financing activities | 684,577 | 2,540,810 |
| Net increase in cash | 82,383 | 288,208 |
| Cash | | |
| Beginning | 348,969 | 60,761 |
| Ending | $ 431,352 | $ 348,969 |

600G

```
Question:
  Cash Beginning 2006?

Answer value extracted by ORIGINAL model:
  348,969

Confidence score generated by SURROGATE model:
 0.9365142005903242

Actual value in PDF document:
 348,969
```

```
Question:
  Total Support and Revenue Value for 2006

Answer value extracted by ORIGINAL model:
  3,780,900

Confidence score generated by SURROGATE model:
 0.09505012831894208

Actual value in PDF document:
 3,967,304
```

700A

700B

700C

700D

| Ground Truth Value | Value Retrieved by Query on Reconstructed Document Tables | Reconstruction Squared Error |
|---|---|---|
| A | B | (A-B)^2 |
| 100 | 0 | 100^2 = 10000 |
| 150 | 200 | 50^2 = 2500 |
| 1000 | 1000 | 0^2 = 0 |
| 2000 | 1500 | 500^2 = 250000 |
| | | |
| Total Reconstruction Squared Error | | 252500 |
| Total Entries | | 4 |
| Reconstruction Mean Squared Error | | 252500/4 = 63125 |

AUTOMATED OPTIMIZATION FRAMEWORK FOR ACCURATE EXTRACTION OF TABULAR DATA FROM DIVERSE PDF DOCUMENTS USING LARGE LANGUAGE MODELS

CROSS-REFERENCE TO RELATED APPLICATIONS

This application claims benefit to Indian Provisional Patent Application No. 202518014650, filed on Feb. 20, 2025, the disclosure of which is incorporated herein in its entirety, by reference.

FIELD OF TECHNOLOGY

The present disclosure generally relates to the fields of document analysis. More specifically, the present disclosure relates to using machine learning (ML) based models for identifying and extracting tabular data present in electronic documents.

BACKGROUND

Many diverse classes of documents, such as financial reports, research papers, market analysis reports, and scientific documents, contain tables to compare, analyze, and understand facts present in the documents. In the field of document analysis, identifying and extracting data from documents, especially portable document format (PDF) documents, that contain complex tables and relational structures may be a challenging and time-consuming task.

Primarily, the challenge in converting data from a PDF document and extracting the data into an Excel® format lies in maintaining the structure of various elements within the PDF document. This challenge is even greater when dealing with tabular data, which are inherently complex and difficult to parse accurately using current solutions. These current methods typically require significant human intervention to ensure the correctness of the parsed data.

The essential elements of tabular data include rows, columns, and the values within each cell of the table. Collectively, these elements define the structure and meaning of the document. Therefore, when converting tabular content, the extraction and reconstruction mechanism must ensure that the relative positions of rows, columns, and values are preserved as closely as possible to their original format in the document. Currently, there is no single, comprehensive solution available for extracting and reconstructing tabular data from PDFs that does not involve human intervention.

Another challenge is a lack of reliable confidence estimation mechanisms. Current models used for extracting answers from tables in documents, PDFs, or any sources containing complex tabular data lack a reliable mechanism to estimate the confidence in these extractions. Some examples of these current models use generative models within Retrieval-Augmented Generation (RAG) architectures or prompting methodologies. Specifically, current techniques involve prompting or RAG architectures and employ various methods to elicit model confidence from large language models (LLMs) using self-consistency prompting or repeated prompting combined with clustering approaches. However, these methods exhibit significant limitations in accurately determining confidence levels, especially when extracting singular numerical answers from extensive and intricate tables. This often leads to models grossly overestimating their certainty, even when the answers are incorrect, thereby compromising the reliability of the extracted data.

Furthermore, generative models are prone to hallucinations, producing answers that do not exist within the source data, which further undermines the robustness and trustworthiness of the information extracted. The existing self-consistency methods exacerbate this issue by maintaining high confidence levels even for erroneous and hallucinatory responses. There does not yet exist a robust solution to determine the confidence measure for answers generated by generative models from a given source data at scale.

In enterprise-grade industrial applications of generative artificial intelligence (AI) (also known as GenAI or GAI), the confidence score for an answer to a question is a vital metric for business users to make crucial decisions as part of the downstream process. The complex nature of PDF documents further complicates and lengthens the process of information extraction without human intervention. Many industrial applications today leverage generative AI to extract information from given documents to enhance business process efficiency. When applying the technology at such a massive scale, it becomes imperative to minimize errors in table reconstruction, data extraction, and LLM hallucinations, as mentioned earlier.

Further challenges include a high human effort and a lack of confidence reporting. All of these issues with the current methods involve substantial human effort and interaction to ensure that information is parsed correctly, making the process very labor-intensive. When some level of automation or machine learning-based solutions are employed, there is often a lack of confidence and no reliable mechanism for reporting the level of confidence in the extraction. This uncertainty means that human operators cannot be sure of the accuracy of the extracted data without extensive manual verification. The absence of a robust system to measure and report confidence levels in the extracted data significantly hampers the efficiency and reliability of automated solutions.

An additional challenge is a lack of self-correcting systems. There is currently no system that is entirely self-correcting and capable of learning from its past mistakes or errors. For any learning system, continuous model updates are essential to address problems like data drift and/or model drift. This involves retraining the model with new data and, at times, generating synthetic data to ensure a diverse and complete dataset. Current solutions for handling data drift and model retraining still require significant manual intervention to curate synthetic data and to automatically adapt the model to new documents in production. This lack of automation in model lifecycle management may lead to inefficiencies and hinder the ability of the system to remain accurate and reliable over time.

SUMMARY

Given the aforementioned deficiencies, there is a need for a system and method that automatically identifies and extracts information from a table in a PDF file to an Excel® format.

According to one aspect of the present disclosure, a system and method provide a holistic framework for performing accurate data reconstruction and extraction and also determining a measure of confidence in the responses generated by generative models. Such a framework may be invaluable in banks, financial institutions, and any area where there is a significant amount of structured information in PDF documents. Accurate and reliable data extraction may be beneficial for decision-making processes, regulatory compliance, and operational efficiency in these sectors. Accordingly, the system and method of the present disclosure provide a comprehensive solution that resolves the challenges of conventional systems and enhances the capabilities of automated data extraction systems, ensuring their widespread adoption and effectiveness in real-world applications.

According to one aspect of the present invention, a computer-implemented method comprises receiving one or more PDF documents by a self-correcting artificial intelligence (AI) framework for extracting and validating tabular data from the PDF documents; extracting and reconstructing the tabular data in a format as extracted data from the PDF documents into a structured dataframe (also spelled as "data frame") using a data extractor module; validating the extracted data by querying the structured dataframe using a comparator module, wherein the comparator module compares the extracted data against predefined criteria and generates a reconstruction loss calculation; adjusting parameters of the data extractor module based on the reconstruction loss calculation using an error correction module.

The error correction module iteratively minimizes the reconstruction loss; continuously adapting the framework to new data using an adaptive learner module, wherein the adaptive learner module monitors the performance of a dual-model architecture and triggers retraining when a high reconstruction loss is detected, and wherein the dual-model architecture comprises a primary LLM module and a secondary model; generating ground truth data and synthetic data using the primary LLM module and a synthetic data generator module, wherein the ground truth data and synthetic data are used to train the secondary model; determining a confidence level of the extracted data using the secondary model; and outputting final extracted data of the data extraction module after validation and error correction processes, ensuring the final extracted data accurately represents an original format of the tabular content of the PDF documents.

According to another aspect, the data extractor module employs a parameter-based data extraction algorithm to read bounding box information from the PDF documents.

According to yet another aspect, the data extractor module processes both searchable and scanned PDF documents. The scanned PDF documents are processed using optical character recognition (OCR) technology to extract the tabular content of the PDF documents.

According to another aspect, the data extractor module employs a column clustering algorithm to ensure proper column alignment in an Excel® file.

According to yet another aspect, the column clustering algorithm calculates content density of each column to ensure proper alignment in the Excel® file.

According to another aspect, the comparator module includes a reconstruction loss calculation to measure the accuracy of the extracted data.

According to yet another aspect, the reconstruction loss calculation is based on a loss function that compares ground-truth answers and the confidence level of the extracted data, and the error correction module constructs a sample space from the extracted data to identify the extracted data that minimizes the loss function.

According to another aspect, the synthetic data generator module creates additional data fields from the same PDF and/or other past PDFs to mimic the correct data distribution and generate incorrect information for training the secondary model.

According to yet another aspect, the secondary model evaluates question, value, and context variables to provide a probabilistic confidence outcome representing a confidence in a correctness of the ground truth answers.

According to another aspect, the primary LLM module generates both correct (positive) and incorrect (negative) question-answer pairs from the tabular data in the PDF document to simulate hallucinatory behavior to mitigate hallucinatory responses.

According to yet another aspect, the error correction module operates in a gradient descent manner to iteratively minimize the reconstruction loss.

According to another aspect, a system comprises a self-correcting AI framework configured to receive one or more PDF documents for extracting and validating tabular data from the PDF documents; a data extractor module configured to extract and reconstruct the tabular data into a structured data frame using a parameter-based data extraction algorithm; a comparator module configured to validate the extracted data by querying the structured data frame and comparing the extracted data against predefined criteria, generating a reconstruction loss calculation; an error correction module configured to adjust parameters of the data extractor module based on the reconstruction loss calculation, iteratively minimizing the reconstruction loss; an adaptive learner module configured to continuously adapt the apparatus to new data by monitoring the performance of a dual-model architecture and triggering retraining when a high reconstruction loss is detected.

The dual-model architecture comprises a primary LLM module and a secondary model; wherein the primary LLM module may be configured to generate ground truth data and use a synthetic data generator module to generate synthetic data, wherein the ground truth data and the synthetic data are used to train the secondary model; wherein the secondary model may be configured to determine a confidence level of the extracted data; wherein the data extractor module employs a column clustering algorithm to ensure proper column alignment in the extracted data; and wherein the framework outputs final extracted data after validation and error correction processes, ensuring the final extracted data accurately represents an original format of the tabular content of the PDF documents.

According to another aspect, a non-transitory computer-readable storage medium stores instructions that when executed by a computer cause the computer to perform a method comprising receiving one or more PDF documents by a self-correcting AI framework for extracting and validating tabular data from the PDF documents; extracting and reconstructing the tabular data in a format as extracted data from the PDF documents into a structured dataframe using a data extractor module; validating the extracted data by querying the structured dataframe using a comparator module, wherein the comparator module compares the extracted data against predefined criteria and generates a reconstruction loss calculation; adjusting parameters of the data extractor module based on the reconstruction loss calculation using an error correction module, wherein the error correction module iteratively minimizes the reconstruction loss; continuously adapting the framework to new data using an adaptive learner module.

The adaptive learner module monitors the performance of a dual-model architecture and triggers retraining when a high reconstruction loss is detected, and wherein the dual-model architecture comprises a primary LLM module and a secondary model; generating ground truth data and synthetic data using the primary LLM module and a synthetic data generator module, wherein the ground truth data and synthetic data are used to train the secondary model; determining a confidence level of the extracted data using the secondary model; and outputting final extracted data of the data extraction module after validation and error correction processes, ensuring the final extracted data accurately represents an original format of the tabular content of the PDF documents.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for the purpose of illustrating the embodiments and are not to be construed as limiting the disclosure. Given the following enabling description of the drawings, the novel aspects of the present disclosure should become evident to a person of ordinary skill in the relevant art(s).

FIGS. 6A-6G illustrate example images of a PDF document as input into the document analysis system for information extraction and confidence determination in accordance with the embodiments.

FIGS. 7A-7E illustrate example images of the operation and outcomes of an optimization algorithm in accordance with the embodiments.

DETAILED DESCRIPTION

Figure 1A:
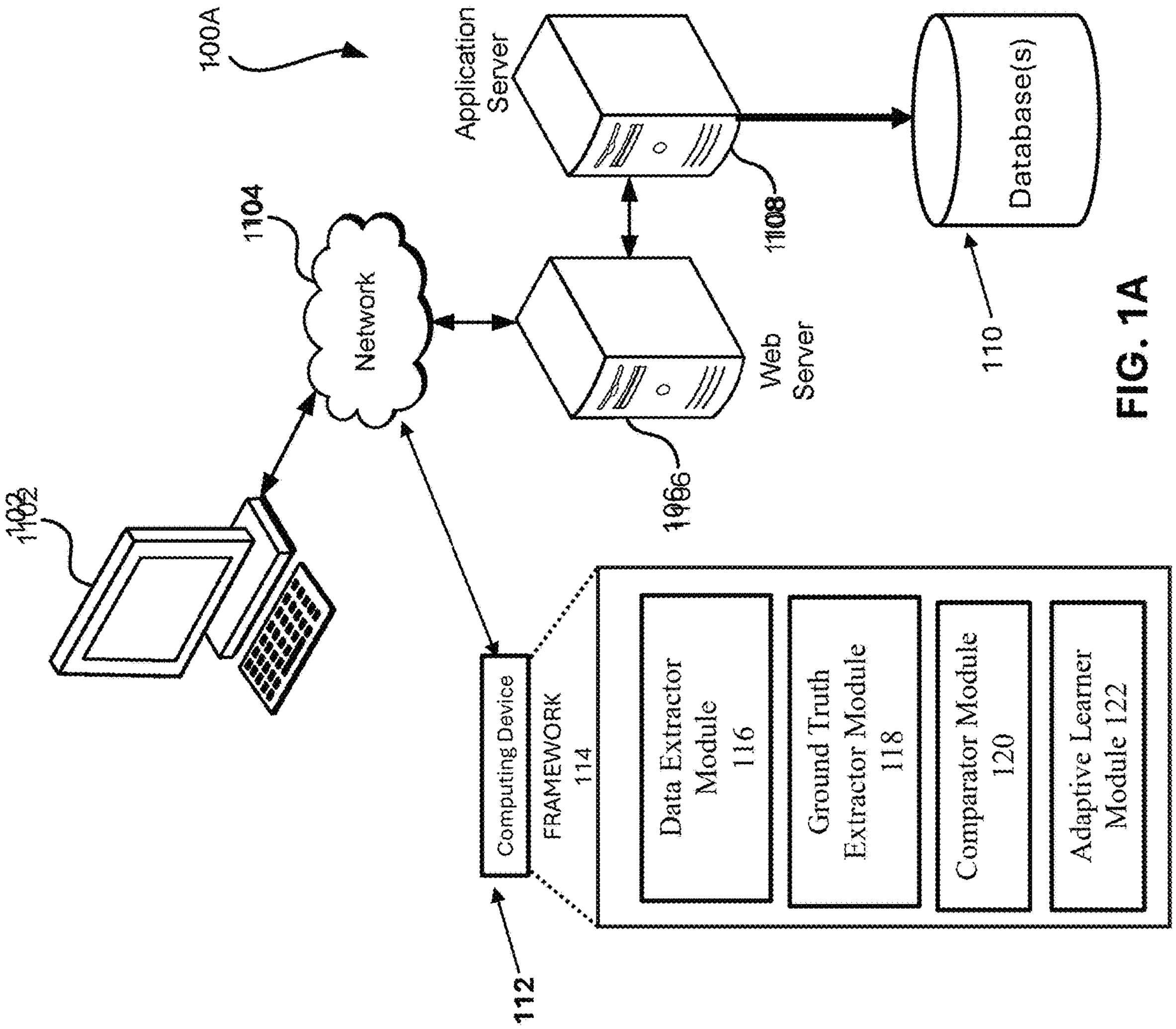
FIG. 1A illustrates an exemplary document analysis system implementing a self-correcting AI framework for extracting tabular data from PDF documents in accordance with embodiments of the present disclosure.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

The examples may also be embodied as one or more non-transitory computer-readable media having instructions stored thereon for one or more aspects of the present technology as described and illustrated by way of the examples herein. The instructions in some examples include executable code that, when executed by one or more processors, cause the processors to carry out blocks necessary to implement the methods of the examples of this technology that are described and illustrated herein.

Various embodiments in the present disclosure provide a comprehensive and automated document analysis system for extracting, reconstructing, and validating tabular data from PDFs, particularly those with complex structures and no clear boundaries.

In certain embodiments, the document analysis system may include a self-correcting mechanism that continuously learns and adapts to new data. This mechanism may involve an adaptive learner and monitoring system that begins an initialization of model retaining when high reconstruction loss is detected, ensuring that the document analysis system remains accurate over time without significant human intervention.

In an embodiment, the document analysis system may use a surrogate model to determine a confidence level of the extracted data. The surrogate model may operate in parallel with a primary LLM and provide a probabilistic outcome indicating the correctness of the extracted values. This approach addresses the issue of overconfidence in the response generated by generative models and enhances the reliability of the extracted data.

In some embodiments, the document analysis system may employ generative AI models to generate ground truth data and synthetic data. According to the present disclosure, many different techniques may be employed to generate synthetic data, including for example, generative AI LLMs and generative adversarial networks (GANs).

In this particular embodiment, the document analysis system may use the primary LLM to generate correct information and a synthetic data generator to create additional data fields, which are then used to train the surrogate model. In such an embodiment, the document analysis system may provide a diverse and comprehensive dataset for training, improving the model's robustness.

In other embodiments, the document analysis system may employ a reconstruction loss function to compare the ground truth answers and confidence with the extracted data. The loss function may cause the error correction module to adjust the parameters of the data extraction algorithm iteratively, minimizing the reconstruction loss and improving the accuracy of the extracted tables.

It is contemplated that, in some embodiments, the document analysis system may integrate data extraction techniques, machine learning, and generative AI models in a cohesive framework. This ensemble approach ensures high performance and adaptability to complex use cases, such as financial documents with intricate tabular data.

In various embodiments, the entire document analysis system may be designed to operate with minimal human intervention. The document analysis system may be configured to use an adaptive learning and monitoring module, along with the self-correcting mechanism, so that there is continuous improvement and adaptation to new document templates, making the solution scalable and efficient for various industrial applications.

Furthermore, the described implementations may include several novel features that collectively provide a robust, automated, and adaptive solution for extracting and validating tabular data from PDFs, addressing the limitations of existing methods and significantly reducing the need for manual intervention.

Although the documents described herein are related to the financial industry, it should be noted that, in other embodiments, the AI-driven document analysis system may process other domain-specific documents using the models retrained by other domain-specific training data.

may be from high-quality annotated datasets, verified databases, or expert-labeled instances. The source of this data may be a gold standard, a gold source, or an authoritative source that is known to be accurate and reliable.

In some embodiments, the ground truth data for the system and method of the present disclosure addresses the problem of conventional systems by introducing an optimization framework specifically designed for extraction tables within PDFs, which traditionally require significant human intervention for accurate extraction. The document analysis system automates the entire process by conceptualizing the possible extractions of a table as a sample space. The optimization algorithm explores this sample space to identify the extraction that minimizes the defined loss function.

Through the optimization of the framework, the document analysis system conceptualizes the space of possible extractions of the table as a sample space. The optimization algorithm explores this space and find the extraction where the loss function is minimized. The loss function may be defined by the reconstruction loss, using all elements of the table obtained by LLMs. One objective of the document analysis system is to minimize this loss function over all possible extractions of the PDF. The optimal extraction may correspond to the minimum value of the loss function, which indicates the minimum reconstruction loss.

In various embodiments, the document analysis system may use LLMs. At the initial stage, partially correct parsings (even without preserving the exact structure of tabular data either fully or partially) may be fed into an LLM to generate the ground truth for the loss function. In embodiments, the LLMs may generate question-answer pairs even from incorrectly parsed data. This capability may be leveraged to serve as the ground truth in the loss function. Although the mean squared error (MSE) may be utilized as the loss function in an embodiment, any well-behaved loss function may serve as an effective alternative.

At a high level, the document analysis system may perform sample space exploration, reconstruction loss function, LLM-generated ground truth, and an optimization process. Through the use of sample space exploration, the optimization algorithm may conceptualize the space of possible extractions of a table as a sample space. It may systematically explore this space to evaluate various extraction configurations.

In embodiments, the reconstruction loss function may be defined by the reconstruction loss, which measures how well the parsed table retains the structure and meaning of the original table in the PDF. The reconstruction loss function may use elements of the table obtained by LLMs.

In an embodiment, the LLM-generated ground truth may be implemented such that incorrect extractions are fed into an LLM, which generates question-answer pairs even from these incorrect extractions. This may serve as the ground truth for the loss function, guiding the optimization process.

In various embodiments, the optimization process may be performed in order that the optimization algorithm minimizes the reconstruction loss function over all possible extractions. In one exemplary embodiment, the optimal extraction may be identified when the loss function reaches its minimum value, indicating the closest match to the original table structure and meaning.

One of the benefits of the system and method of the present disclosure may be cost-effectiveness. The approach of the present disclosure is relatively cost-effective as it requires only a single access to an LLM and does not depend on expensive vision-based technologies for extraction. This makes the solution affordable and straightforward to implement.

Another benefit of the system and method of the present disclosure may be scalability and replicability. The system and method are highly scalable and replicable, with limitations only imposed by the compute and memory capacity of the host machine. Enhanced computational power and parallelization capabilities lead to more efficient exploration of the sample space and quicker identification of the optimal extraction.

A further benefit may be the elimination of human intervention. The solution of the present disclosure may automate the entire process of extraction tables from PDFs, thereby eliminating the necessity for manual intervention. This significantly enhances efficiency and reduces human error.

FIG. 1A illustrates an exemplary document analysis system 100A implementing various embodiments of a self-correcting AI framework ("framework") 114 for extracting data from a PDF document into an Excel® format described herein. The framework 114 may include a plurality of components or modules executed or otherwise implemented using at least one computing device 112. For example, the framework 114, also shown in FIG. 1B, may include four main modules: a data extractor module 116, a ground truth extractor module 118, a comparator module 120, and an adaptive learner module 122. The computing device 112 may be configured to execute or otherwise performs operations associated with the data extractor module 116, the ground truth extractor module 118, the comparator module 120, and the adaptive learner module 122 defined by the framework 114.

In some embodiments, one or more of the modules 116, 118, 120, and 122, may be implemented as code and/or machine-executable instructions executable by the computing device 112 that may represent one or more of a procedure, a function, a subprogram, a program, a routine, a subroutine, a module, a software package, a class, or any combination of instructions, data structures, or program statements, and the like. In other words, embodiments of the framework 114 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium, and a processor(s) associated with the computing device 112 that may perform the tasks defined by the code.

In various embodiments, the system and method of the present disclosure may solve the above-mentioned business problems utilizing the framework 114, which may consist of a machine learning-based data extractor and a surrogate model-based mechanism to determine confidence for LLM responses. As shown in the examples of FIGS. 1-2, some of the main components of the framework 114 may include the data extractor module 116, the ground truth extractor module 118, the comparator module 120, and the adaptive learner module 122.

The data extractor module 116 may be configured to retrieve data from various sources to prepare it for further processing and analysis. In an embodiment, the data extractor module 116 may be configured as a data extraction algorithm. The data extraction algorithm may be configured to automatically identify and retrieve relevant information from a variety of data sources, such as documents, databases, or websites. The data extraction algorithm may be able to process unstructured or semi-structured data to convert it into structured, usable formats. In the embodiments, the data extraction algorithm may gather the raw data from various sources. The data may be collected, for example, from web scraping, application programming interfaces (APIs), or importing data files (e.g., PDFs, Excel, or hypertext markup language (HTML)).

In a preprocessing stage of the data extractor module 116, the data may be cleaned and formatted to ensure consistency. This might involve removing irrelevant information, handling missing values, or converting the data into a consistent format (e.g., text normalization or tokenization).

Using algorithms such as regular expressions, machine learning, or rule-based systems, the data extractor module 116 may identify patterns or keywords that signify important data points. For example, in a PDF document, the data extractor module may use OCR technology to identify elements (e.g., images, graphs) and text characters in a scanned PDF document. An OCR engine may analyze the patterns of light and dark pixels that make up the defined characteristics of each character and then apply these patterns to known rulesets in order to identify each individual character in a document. As a result, actionable data in a structured, usable format may be obtained.

Once patterns are detected, the data extractor module 116 may extract the relevant pieces of information, such as numbers, dates, or text fragments. This block may involve techniques like named entity recognition (NER) to detect entities such as people or organizations, or keyword-based extraction for specific terms.

After extraction by the data extractor module 116, the data may be structured into a consistent format, such as tables, JavaScript object notation (JSON), or comma-separated values (CSV), to make it usable for further analysis. This block may include aggregating the data or organizing it into hierarchical structures.

In some embodiments of the data extractor module 116, the extracted data may be verified against predefined rules or models to ensure its accuracy. If the extraction is imperfect, the data extraction algorithm may need adjustments or retraining to improve its accuracy.

Finally, in the data extractor module 116, the extracted and structured data may be output for use in processes performed by other components in the document analysis system 100A.

In an embodiment according to the present disclosure, the data extractor module 116 may be configured as a parameter-based data algorithm that extracts and reconstructs tabular content from PDF documents into a structured dataframe. In an embodiment, the data extractor module 116 may incorporate machine learning models or natural language processing (NLP) to improve its ability to understand context, handle ambiguity, and improve accuracy over time.

In various embodiments, the ground truth extractor module 118 may be a tool or algorithm designed to identify and retrieve the most accurate, verified, or authoritative data (referred to as the "ground truth") from a dataset, for the purpose of training, evaluating, or validating machine learning models. The ground truth extractor module 118 may be used to ensure high-quality inputs for machine learning models, benchmarking, or any system that requires accurate and reliable reference data. The ground truth data represents the actual or real-world values that are used as a reference to compare and assess the performance of data extractor algorithm of the data extractor module 116.

In the ground truth extractor module 118, the ground truth extraction process may start by gathering raw data from a trusted source. Thise ground truth extractor module 118 may be derived from automated or manually labeled or verified the data. For example, in image classification, the ground truth may involve tagging objects within an image. For text-based tasks, the ground truth may involve marking specific keywords, phrases, or categories that should be identified in the data.

Once the raw data is collected, the ground truth extractor module 118 may preprocess the raw data to standardize its format and remove noise. This block ensures that the data is consistent and free of irrelevant information, making it easier to extract the ground truth. Preprocessing by the ground truth extractor module 118 may include removing duplicate entries, correcting errors, or transforming the data into a structured format (e.g., tables and labeled images).

During the ground truth extraction phase, the algorithm or tool automatically may identify and isolate the verified data points (the ground truth) from the larger dataset. In machine learning contexts, the algorithm may use predefined criteria, patterns, or heuristics to locate ground truth values. For example, in object detection, the ground truth extractor may identify the coordinates and labels of objects automatically or manually annotated in an image. In text classification, the ground truth extractor may extract the correct labels assigned to text samples.

In the ground truth extractor module 118, the extracted ground truth data may be verified to ensure that it matches the actual, authoritative values. This may be performed through cross-checking against multiple trusted sources, comparing with expert opinions or labeled data, and using automated checks to confirm consistency across different samples.

Once the ground truth data is extracted and validated, the ground truth extractor module 118 may integrate the ground truth data into a larger dataset for further analysis or model training. This integration with other data may involve merging ground truth data with other inputs, such as predictions from a model, to create training datasets or for use in evaluation.

The final ground truth dataset may be used to train machine learning models or to evaluate their performance.

In supervised learning, the ground truth data may serve as the target labels that the model is trying to predict. It may also be used in performance metrics, such as accuracy, precision, recall, or an F1-score, to compare the model's predictions with the known ground truth.

The ground truth extraction process may be continuously refined to improve the quality and accuracy of the ground truth data. This continuous improvement may include feedback loops where model predictions are re-checked and re-labeled, or using semi-automated tools to assist with the labeling process.

In the various embodiments, the comparator module 120 may be used to compare and verify data during the extraction process to ensure accuracy, consistency, and relevance. The comparator module 120 may act as a decision-making component that evaluates the extracted data against predefined criteria, standards, or other data sources to make judgments about whether the data is correct, relevant, or meets the required specifications.

First, as described above, the data extractor module 116 may collect raw data from various sources, such as documents, websites, or databases. This data may be unstructured (like text or images) or semi-structured (like tables or forms), and it needs to be processed and converted into a usable format.

The comparator module 120 may be equipped with a set of predefined rules, thresholds, or criteria that define what constitutes "correct" or "relevant" data. These may be threshold values, pattern matching, relationships between data, and cross-referencing. The threshold values may be numeric values that the data must meet, such as a minimum or maximum price, quantity, or date range. The pattern matching may include specific patterns or regular expressions that the data must follow, such as date formats (e.g., DD/MM/YYYY) or address formats. The relationships between data may define certain data points that must follow a logical relationship, such as a date of birth that must precede a date of employment. In cross-referencing, the extracted data may be compared against a trusted source (ground truth or reference data), ensuring the extracted data is consistent with external, verified datasets.

After the extraction process identifies the relevant data points using the data extractor module 116 and the ground truth extractor module 118 as described above, the comparator module 120 may compare these against the defined criteria. In a direct comparison, for structured data like numbers or dates, the comparator module 120 may check to determine if the extracted values match or are within the acceptable range. In a pattern matching comparison, for textual data or unstructured content, the comparator module 120 may check to determine if the data matches a regular expression, keyword, or predefined format (for example, ensuring that a phone number matches the expected format like (XXX) XXX-XXXX). In a cross-referencing comparison, the comparator module 120 may cross-check the extracted data with external datasets or databases, ensuring that the information (e.g., company names, product descriptions, or geographic locations) aligns with existing, reliable sources.

The comparator module 120 may make decisions based on the results of these comparisons. There are a few possible decision-making outcomes, such as validation, flagging errors, and refinement. For example, if the extracted data meets the comparison criteria, the comparator module 120 considers the extracted data as valid and passes it to the next stage for processing or storage for further use. If the data fails to meet the criteria (e.g., incorrect format, out-of-range values, or inconsistencies), the comparator module 120 may flag the data as erroneous or incomplete. This may trigger alerts for further review, or it might automatically trigger corrective actions like re-extraction or automated or manual validation. In some cases, the comparator module 120 may not simply reject the data but suggest refinements. For instance, the comparator module 120 may identify a typographical error and suggest a correction based on a known pattern (e.g., recognizing that "NY" likely refers to "New York").

Through the implementation of a feedback loop, if a discrepancy is detected, the comparator module 120 may trigger an update to the data extraction process, refining the model or rules for future extractions. This may involve re-training a machine learning model, adjusting thresholds, or introducing new comparison criteria based on detected patterns.

The comparator module 120 may produce an output that indicates the status of the extracted data. If the data passes the comparison tests, it moves forward in the system for further processing. If errors are found, the comparator module 120 may generate, in some embodiments, error reports, logs, or alerts that detail the discrepancies, allowing for automated correction or human intervention.

Various embodiments of the comparator module 120 may enable continuous learning and improvement to evolve to handle more complex or ambiguous situations. For example, the comparator module 120 may utilize machine learning-based comparators to learn from past errors and successes, improving its accuracy in future comparisons. This may make the document analysis system 100A adaptable to new types of data or changing formats without requiring complete manual reprogramming.

After the comparator module 120 ensures the accuracy and quality of the extracted data by verifying that the data is valid, consistent, and reliable, the extracted data may be used in further analysis or applications.

In various embodiments, the adaptive learner module 122 may be a type of machine learning model or system that adjusts its behavior or learning process based on new data, feedback, or changes in its environment. One of the goals of the adaptive learner module is to improve its performance over time by continuously refining its understanding and predictions, making it capable of handling dynamic and evolving situations.

The adaptive learner module 122 may begin the adaptive learning process with an initial model or algorithm, which may be trained on a dataset. In supervised learning, the adaptive learner module 122 may use labeled data to build a model that can predict certain outcomes (e.g., classifying images or predicting house prices). In unsupervised learning, the adaptive learner module 122 may try to discover patterns or structures in the data without predefined labels. During this stage, the adaptive learner module 122 may form its first set of parameters or rules that define its behavior, such as weights in a neural network or decision boundaries in a classifier.

After the model has been trained, it may be tested on new or unseen data to evaluate its performance. If the model makes incorrect predictions or the outcomes are suboptimal, the adaptive learner module 122 may receive feedback (either through an error metric like loss or performance score) that highlights where its predictions deviate from the expected outcomes. The feedback may serve as a signal that the model's parameters or decision rules need adjustment.

Based on the feedback, the adaptive learner module 122 may adjust its model parameters to reduce errors and improve future predictions. Examples of learning methods that the adaptive learner module 122 may use include, for example, gradient descent, reinforcement learning, and rule refinement. Through the implementation of gradient descent learning in neural networks or other models, the adaptive learner module 122 may adjust weights based on the gradient of the error with respect to the model's parameters. In reinforcement learning, the adaptive learner module 122 may adjust its actions based on rewards or penalties received after taking specific actions, refining its behavior through exploration and exploitation. Employing rule refinement in the context of decision trees or rule-based systems, the adaptive learner module 122 may refine the rules or decision boundaries based on new data to improve accuracy. In the embodiments, the learning process may be iterative such that the model continuously fine-tunes itself to reduce errors and improve performance.

As the adaptive learner module 122 continues to receive new data or feedback, it may adapt to these changes, for example, through handling drifting data or dynamic updates. Through handling drifting data, in real-world applications, the data distribution may change over time (concept drift). The adaptive learner module 122 may detect these changes and adjust accordingly, rather than maintaining a static model that may become outdated. By employing dynamic update techniques, the adaptive learner module 122 may learn incrementally, meaning it may be updated continuously as new data arrives without retraining from scratch.

This adaptability may be beneficial in applications where the environment or input data evolves over time, such as stock market prediction, personalized recommendations, or real-time autonomous systems.

In certain embodiments (especially in reinforcement learning), the adaptive learner module 122 may engage in exploration and exploitation. The adaptive learner module 122 may explore new strategies or actions to gather more information (exploration) or focus on the strategies it knows to be effective (exploitation). For instance, over time, the adaptive learner module 122 may shift towards exploiting successful strategies while continuing to explore new possibilities to improve performance Various embodiments of the adaptive learner module 122 may enable performance monitoring and adjustment. The performance of the adaptive learner module 122 may be constantly monitored. If performance plateaus or degrades (due to overfitting, concept drift, or other issues), the document analysis system 100A may apply additional methods like regularization or retraining to ensure the adaptive learner module 122 continues to improve or maintain accuracy.

Exemplary embodiments of the adaptive learner module 122 may be designed to continuously learn from new experiences. This continuous learning may be performed in several ways including real-time learning, incremental learning, and self-improvement learning. For example, the adaptive learner module 122 may update its knowledge in real-time as new data becomes available, without requiring the model to be retrained on the entire dataset. In incremental learning, the adaptive learner module 122 may learn progressively from data in small batches, integrating new information without forgetting previous lessons. Through the use of self-improvement learning, the adaptive learner module 122 may use mechanisms such as meta-learning to optimize how it learns, adjusting the learning process itself based on performance.

In essence, the adaptive learner module 122 may be configured to be flexible and capable of adjusting to changes in data, environments, or tasks, making it well-suited for dynamic and evolving situations. The adaptive learner module 122 may use continuous learning, feedback loops, and adjustments to improve its predictive performance, accuracy, and efficiency with each iteration.

As further shown in FIG. 1A, the document analysis system 100A may further include the framework 114 through the use of computing device 112 may be coupled to a plurality of server devices 106, 108 that hosts a plurality of database(s) 110, and also to a plurality of client devices 102 via communication network(s) 104. A communication interface of the framework 114, such as a network interface of a computer system, operatively couples and communicates between the framework 114, the server devices 106, 108, and/or the client device(s) 102, which are all coupled together by the communication network(s) 104, although other types and/or numbers of communication networks or systems with other types and/or numbers of connections and/or configurations to other devices and/or elements may also be used.

The communication network(s) 104 may be exemplary as described with respect to FIG. 1A, although the framework 114, the server devices 106, 108, and/or the client device(s) 102 may be coupled together via other topologies. Additionally, in a network environment, the document analysis system 100A may include other network devices such as one or more routers and/or switches, for example, which are well known in the art and thus will not be described herein.

By way of example only, the communication network(s) 104 may include local area network(s) (LAN(s)) or wide area network(s) (WAN(s)) and can use transmission control protocol/internet protocol (TCP/IP) over Ethernet and industry-standard protocols, although other types and/or numbers of protocols and/or communication networks may be used and are within the spirit and scope of the embodiments. The communication network(s) 104 in this example may employ any suitable interface mechanisms and network communication technologies including, for example, tele-traffic in any suitable form (e.g., voice, modem, and the like), public switched telephone network (PSTNs), Ethernet-based packet data networks (PDNs), combinations thereof, and the like.

The framework 114 may be a standalone device or integrated with one or more other devices or apparatuses, such as one or more of the server devices 106, 108, for example. In one particular example, the framework 114 may be hosted by one of the server devices 106, 108, and other arrangements are also possible. Moreover, one or more of the devices of the framework 114 may be hosted in the same or a different communication network including one or more public, private, or cloud networks, for example.

Any of the server devices 106 and 108 may include, among other features, one or more processors, a memory, and a communication interface, which are coupled together by a bus or other communication link, although other numbers and/or types of network devices may be used. The server devices 106, 108 in this example may process requests received from the framework 114 via the communication network(s) 104 according to the hypertext transfer protocol (HTTP) and/or JSON protocol. Other known protocols are envisioned and are within the spirit and scope of the embodiments.

The server devices 106, 108 may be hardware or software or may represent a system with multiple servers in a pool, which may include internal or external networks. The server devices 106, 108 may host the database(s) 110 that are configured to store metadata sets, data quality rules, and newly generated data.

Although the server devices 106, 108 are illustrated as single devices, one or more actions of each of the server devices 106, 108 may be distributed across one or more distinct network computing devices that together comprise one or more of the server devices 106, 108. Moreover, the server devices 106, 108 are not limited to a particular configuration. The server devices 106, 108 may contain a plurality of network computing devices that operate using a master/slave approach, whereby one of the network computing devices of the server devices 106, 108 operates to manage and/or otherwise coordinate operations of the other network computing devices.

The server devices 106, 108 may operate as a plurality of network computing devices within a cluster architecture, a peer-to-peer architecture, virtual machines (VMs), or within a cloud architecture, for example. Thus, the technology disclosed herein is not to be construed as being limited to a single environment, and other configurations and architectures are also envisaged.

Client device 102, in this context, refers to any computing device that interfaces to the communications network(s) 104 to obtain resources from one or more server devices 106, 108 or other client device(s) 102.

In some embodiments, the client device(s) 102 in this example may include a specific type of computing device that can facilitate the implementation of the framework 114 that may automatically migrate a set of rules from one platform to another platform, but the disclosure is not limited thereto.

Accordingly, the client device(s) 102 may be mobile computing devices, desktop computing devices, laptop computing devices, tablet computing devices, VMs (including cloud-based computers), for example.

The client device(s) 102 may run interface applications, such as standard web browsers or standalone client applications, which may provide an interface to communicate with the framework 114 via the communication network(s) 104 in order to communicate user requests. The client device(s) 102 may further include, among other features, a display device, such as a display screen or touchscreen, and/or an input device, such as a keyboard, for example.

Although the document analysis system 100A with the framework 114, the server devices 106, 108, the client device(s) 102, and the communication network(s) 104 are described and illustrated herein in a network environment, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the document analysis system 100A, such as the framework 114, the server devices 106, 108, or the client device(s) 102, for example, may be configured to operate as virtual instances on the same physical machine. For example, one or more of the framework 114, the server devices 106, 108, or the client device(s) 102 may operate on the same physical device rather than as separate devices communicating through the communication network(s) 104. Additionally, there may be more or fewer framework 114, server devices 106, 108, or client device(s) 102 than illustrated in FIG. 1A.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic networks, cellular traffic networks, PDNs, the Internet, intranets, and combinations thereof.

Figure 1B:
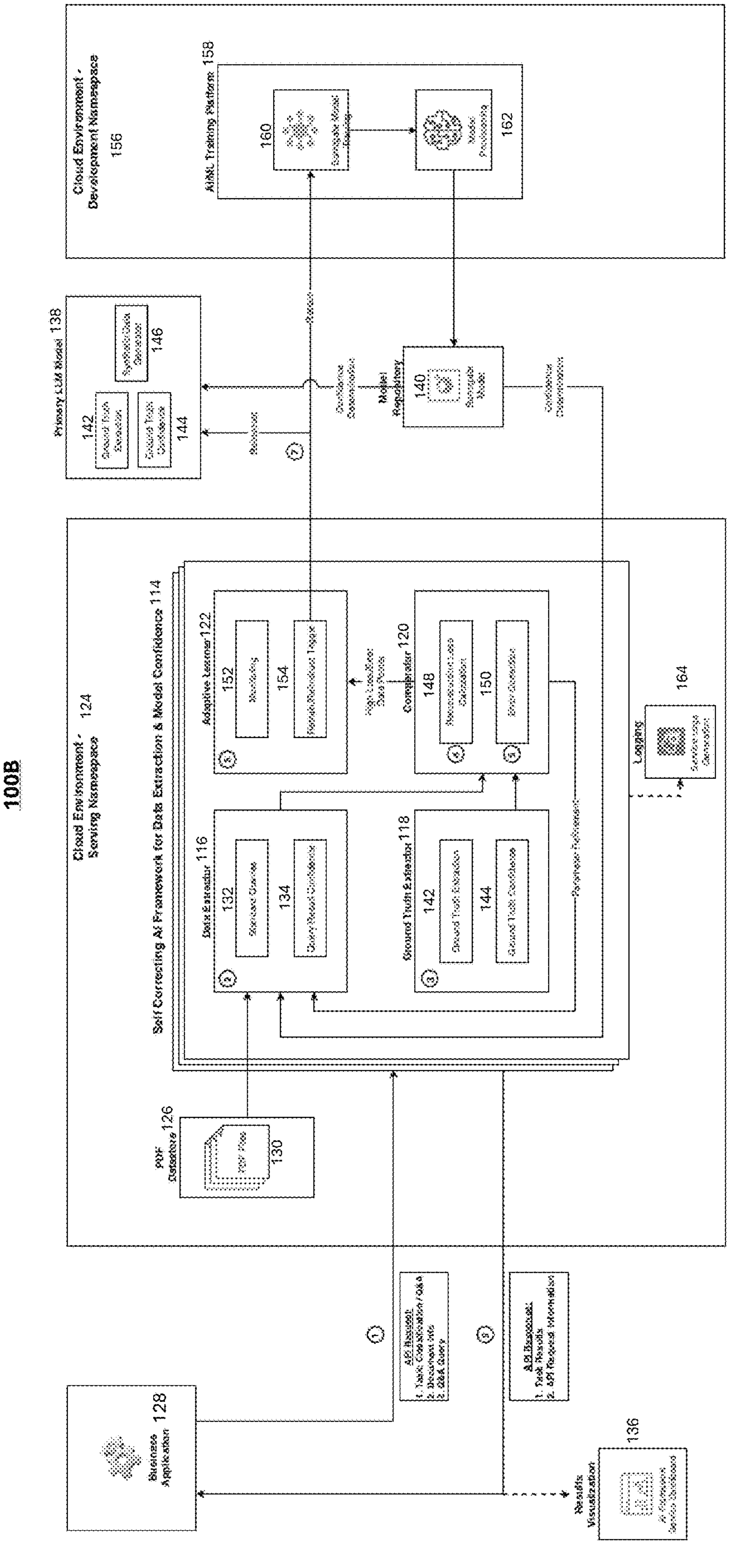
FIG. 1B illustrates an exemplary document analysis system implementing a self-correcting AI framework for extracting tabular data from PDF documents in a cloud environment in accordance with the embodiments.
Figure 2:
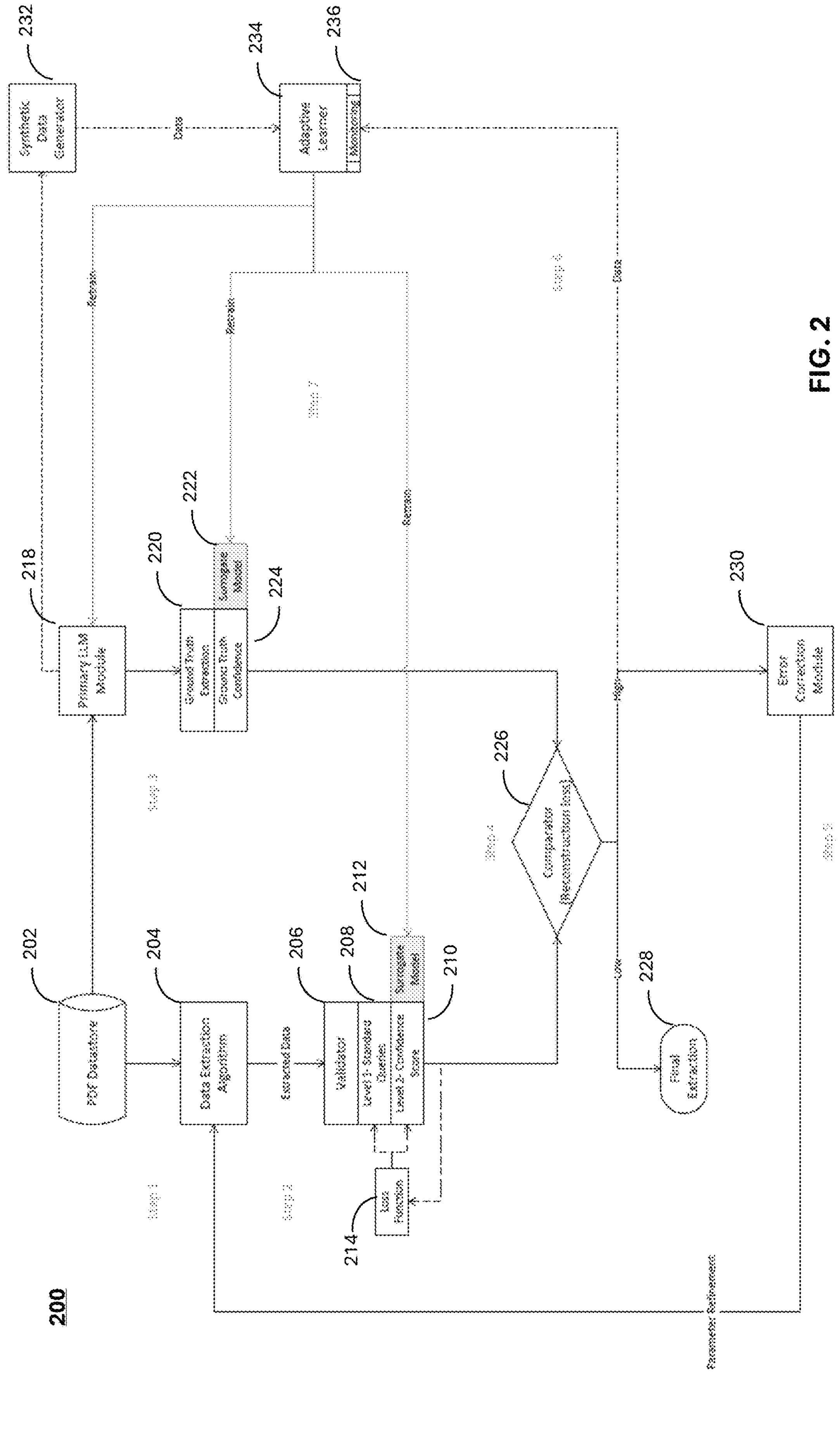
FIG. 2 illustrates an exemplary flow diagram of a method for extracting tabular data from PDF documents in accordance with the embodiments.

FIG. 1B illustrates an exemplary document analysis system implementing the framework 114 for extracting tabular data from PDF documents into an Excel® format deployed in a cloud environment 124. The framework 114 may be configured to identify tables within PDF documents and extract the information from it. Table detection is the process of identifying tables from a document and extracting the cells contained in the tables. As illustrated in FIG. 1A, the framework 114, also shown in FIG. 1B, may include four main modules: the data extractor module 116, the ground truth extractor module 118, the comparator module 120, and the adaptive learner module 122.

In FIG. 1B, the input to the document analysis system 100B may be one or more PDF documents. The PDF documents may be scanned or searchable documents. The document analysis system 100B may include a datastore (also spelled as "data store") that contains a number of database tables or other data storage schemas. In embodiments, the datastore may be a PDF datastore 126 that includes at least a database of PDF files 130. In various embodiments, data from PDF documents sourced from various sources, such as business applications 128, may be fed into the framework 114 along path (1) and written to the datastore 126.

The PDF datastore 126 may serve as a secured storage system for PDF documents sourced from various business applications 128. The PDF datastore 126 may ensure that all PDF files 130 are stored in a centralized and secure manner, facilitating easy access and retrieval for subsequent data extraction processes. The PDF datastore 126 may interact at point (2) with the data extractor module 116 by providing the PDF documents for processing. The storage system may be implemented using cloud-based solutions or on-premises storage systems, depending on the specific requirements and constraints of the business environment. The PDF datastore 126 may ensure data integrity and security, which is essential for handling sensitive financial documents.

The framework 114 may receive along path (1) as input into the document analysis system 100B an API request from one or more of the various business applications 128. The API request may relate to a task such as the classification of a request for proposal (RFP) document, document information, and/or a question-and-answer query. Further, the document analysis system 100B may use the framework 114 to provide a response along path (8) as output to the various business applications 128. The response may include task results and API request information.

A result visualization component 136 may be provided to visualize the result data generated by the framework 114. For example, the result visualization component 136 may visualize the results in the form of a graph, a table, a Web page, etc. as provided to the user on an AI framework service dashboard.

In FIG. 1B, the data extractor module 116 may be configured to receive data from various sources to prepare it for further processing and analysis. In an embodiment, the data extractor module 116 may be configured as a data extraction algorithm. The data extraction algorithm may be configured to automatically identify and retrieve relevant information from a variety of data sources, such as documents, databases, or websites. The data extraction algorithm may be able to process unstructured or semi-structured data to convert it into structured, usable formats. In the embodiments, the data extraction algorithm may gather the raw data from various sources. The data may be collected, for example, from web scraping, APIs, or importing data files (e.g., PDFs, Excel, or HTML).

In a particular embodiment shown in FIG. 1B, the data extractor module 116 may be a parameter-based algorithm configured to extract and reconstruct tabular content from the PDF documents into a structured dataframe. The data extractor module 116 may read bounding box information from the PDF documents, which includes coordinates defining the location of each word. In embodiments, the data extractor module 116 may process both searchable PDFs and scanned PDFs by utilizing extensible markup language (XML) generation or OCR engines, respectively.

The extracted data may then be aligned into rows and columns, maintaining the structural integrity of the original tables. The data extractor module 116 may employ a column clustering algorithm to ensure proper column alignment, even when the text within a single column has different horizontal positions. The data extractor module 116 may interact with the PDF datastore 126 to retrieve the documents and with the comparator module 120 to validate the extracted data.

The data extractor module 116 may apply a layout analysis to the PDF document to determine the coordinates of lines, text boxes, figures, characters, and rectangles. In various embodiments, to identify and extract tables, the data extractor module 116 may use elements such as a PDF reader, a bounding box extraction technique, row and column alignment, and a column clustering algorithm to define column alignment. For example, the data extractor module 116 may use any programmatic PDF reader, such as an OCR engine or PDFMiner, to read the PDF document from a file storage into a program memory. The PDF reader may provide information about the PDF document, such as the page size of the PDF document.

The data extractor module 116 may determine the tables with the help of coordinates provided by the PDF reader. The data extractor module 116 may parse every page of the PDF document and may employ a bounding box extraction technique so that bounding boxes are extracted for each word in the PDF document. The bounding boxes may denote the x0, x1, y0, and y1 coordinates defining the location of each word in the document.

In the case of a searchable PDF document, the XML of the PDF may be generated, which in turn produces the bounding boxes for each word. In the case of a scanned PDF document, the OCR engines may provide the bounding boxes for each word. Accordingly, there may be no restriction on the type of PDF document that may be analyzed and processed by the data extractor module 116 described herein. The data extractor module 116 may retrieve the bounding box information from any type of PDF document using programmatic mechanisms and techniques.

In various embodiments, the data extractor module 116 may perform row alignment and column alignment such that the y0 and y1 coordinates may define the horizontal position of the content. Likewise, the x0 and x1 coordinates may define the horizontal position of the content. These coordinates are translated to the scale of the page size. In an embodiment, each page is considered as a dataframe with a number of rows equal to the page height in inches. For example, if the page height is 20 inches, then it may be translated into 20 dataframe rows. Likewise, if the page width is 8 inches, then it may be translated into 8 dataframe columns. Thus, the resultant dataframe is of size 20 rows and 8 columns.

The data extractor module 116 may be configured to find the bounding box for each text in the table of the PDF document. To determine the bounding box of a particular character in the table, the data extractor module 116 using the algorithm may determine the maximum value of the left vertical line (max(V_Left)), the minimum value of the right vertical line (min(V_Right)), the minimum value of the lower horizontal line (max(H_Down)), and the maximum value of the upper horizontal line (min(H_Up)). This example considers the convention of an axis-aligned bounding box wherein the top left of a page has co-ordinates (0,0) as reference. This may be adjusted as needed to suit to any other data extractor algorithm basis location of its reference point of (0,0). In some embodiments, the data extractor module 116 may use oriented bounding boxes to detect text in the PDF documents, for example, for tables without borders or tables that do not have well-defined borders. The data extractor module 116 may calculate all these values for every character of the table to determine each bounding box. The extracted data from the table may then be used to create a dataframe. The dataframe may then be used to load the values into the Excel® sheet as shown in FIG. 3.

Figure 3:
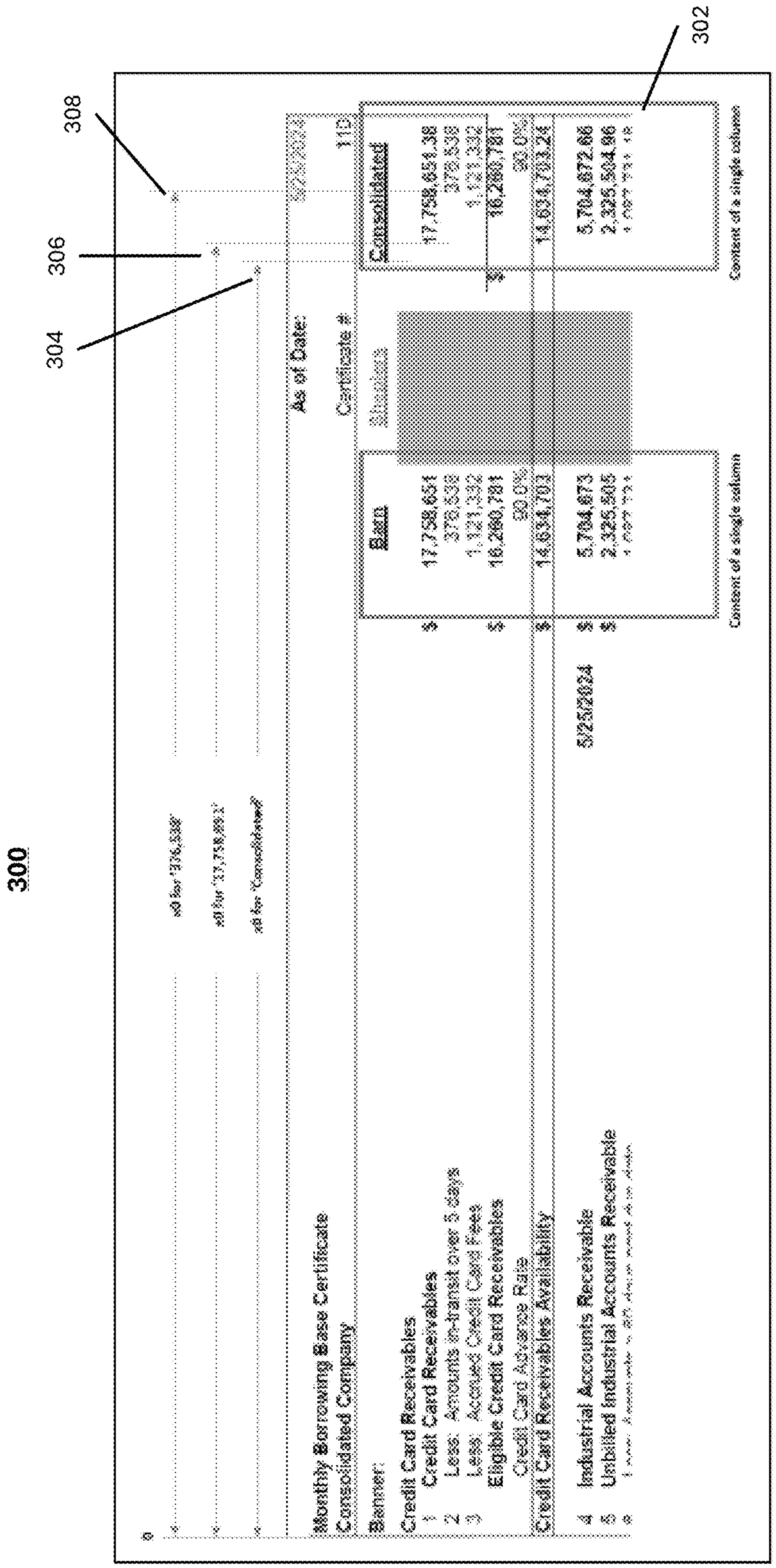
FIG. 3 shows an example image of data extracted from a PDF document and loaded into an Excel® sheet generated using a column clustering algorithm to define column alignment in accordance with the embodiments.

FIG. 3 shows an example image 300 of the results of data extracted from a PDF document and loaded into an Excel® sheet generated using a column clustering algorithm to define column alignment. As shown in the example of FIG. 3, the data extractor module 116 may implement a column clustering algorithm to define column alignment in the Excel® sheet. In the example of FIG. 3, consider the column 302 on the right in the figure. Although the horizontal positions of the text within a single column are different, they belong to the same column.

Namely, in FIG. 3, the term "Consolidated" at the position indicated by arrow 304, the number "17,758,651.38" at the position indicated by arrow 306, and the number "376,538" at the position indicated by arrow 308 all have different x0 positions but they belong to the same column.

FIG. 3 illustrates that although the text may be right aligned, referring to x1 positions, the column clustering algorithm may not produce the correct alignment (e.g., place all content in a single column). However, in various embodiments, the text may not be right aligned. In other embodiments, the text may be center-aligned and left-aligned as well. As in FIG. 3, the left-most column 310 in the sample tabular illustrates a different alignment position other than the right alignment. Hence, in this example, the x0 and x1 coordinates by themselves do not produce the final column or position of the content to translate into the parsed table.

Columnar alignment ensures accuracy for the extraction algorithm for tabular content. To resolve this issue of columnar misalignment, in some embodiments, the data extractor module 116 may use a column clustering algorithm.

Figure 4A:
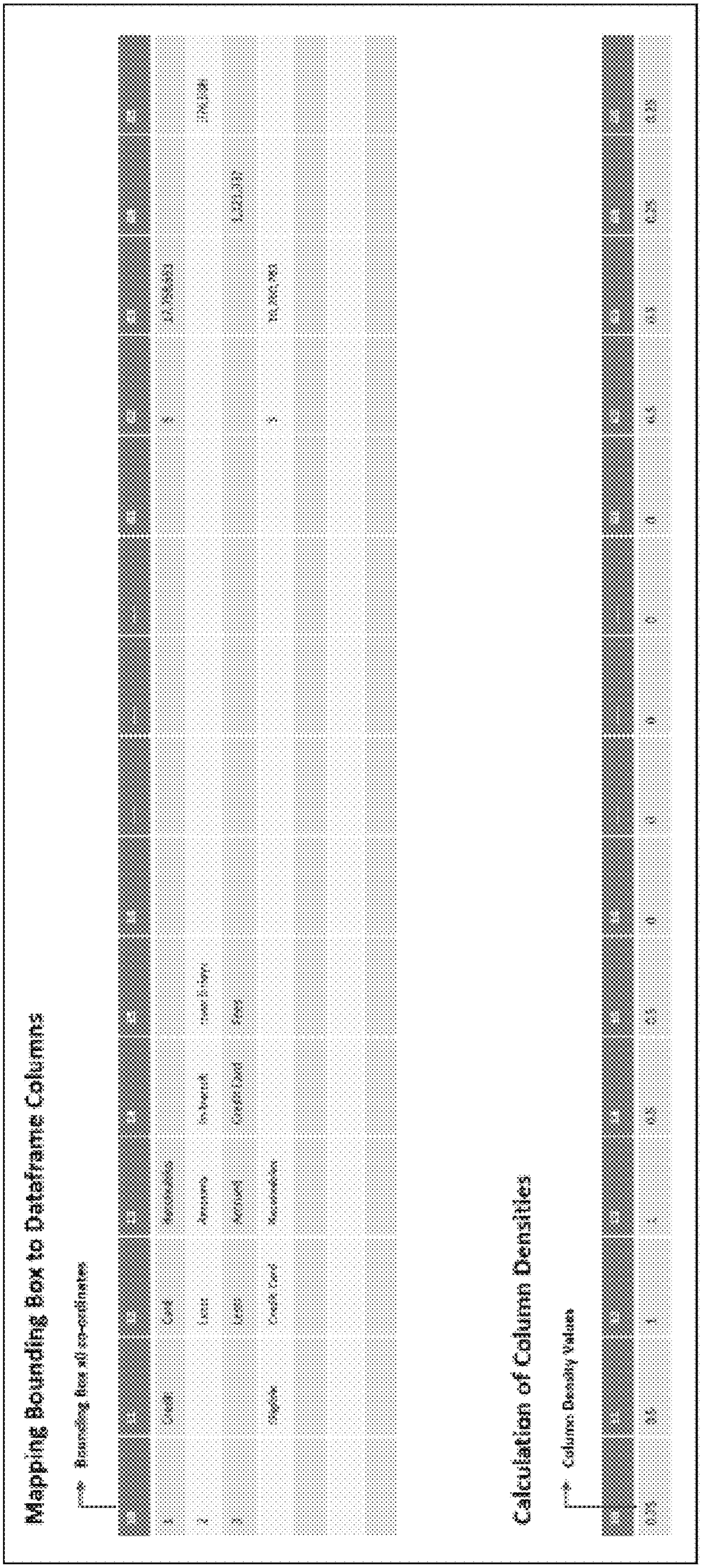
FIG. 4A illustrates an image of an initial block of mapping a bound box to dataframe columns of a column clustering algorithm in accordance with the embodiments.
Figure 4B:
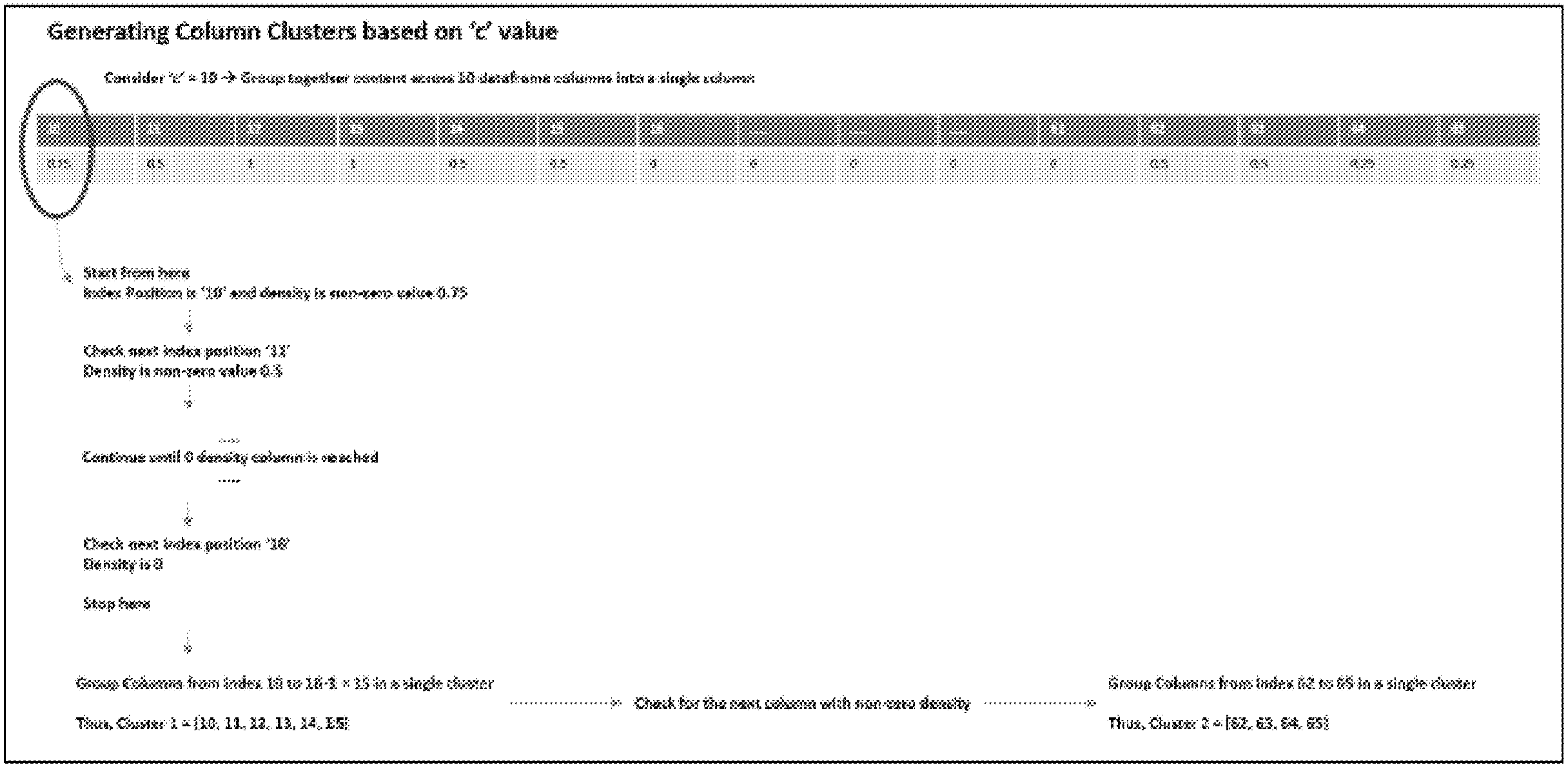
FIG. 4B illustrates an image of an intermediate block of generating column clusters based on the 'c' value of the column clustering algorithm in accordance with the embodiments.
Figure 4C:
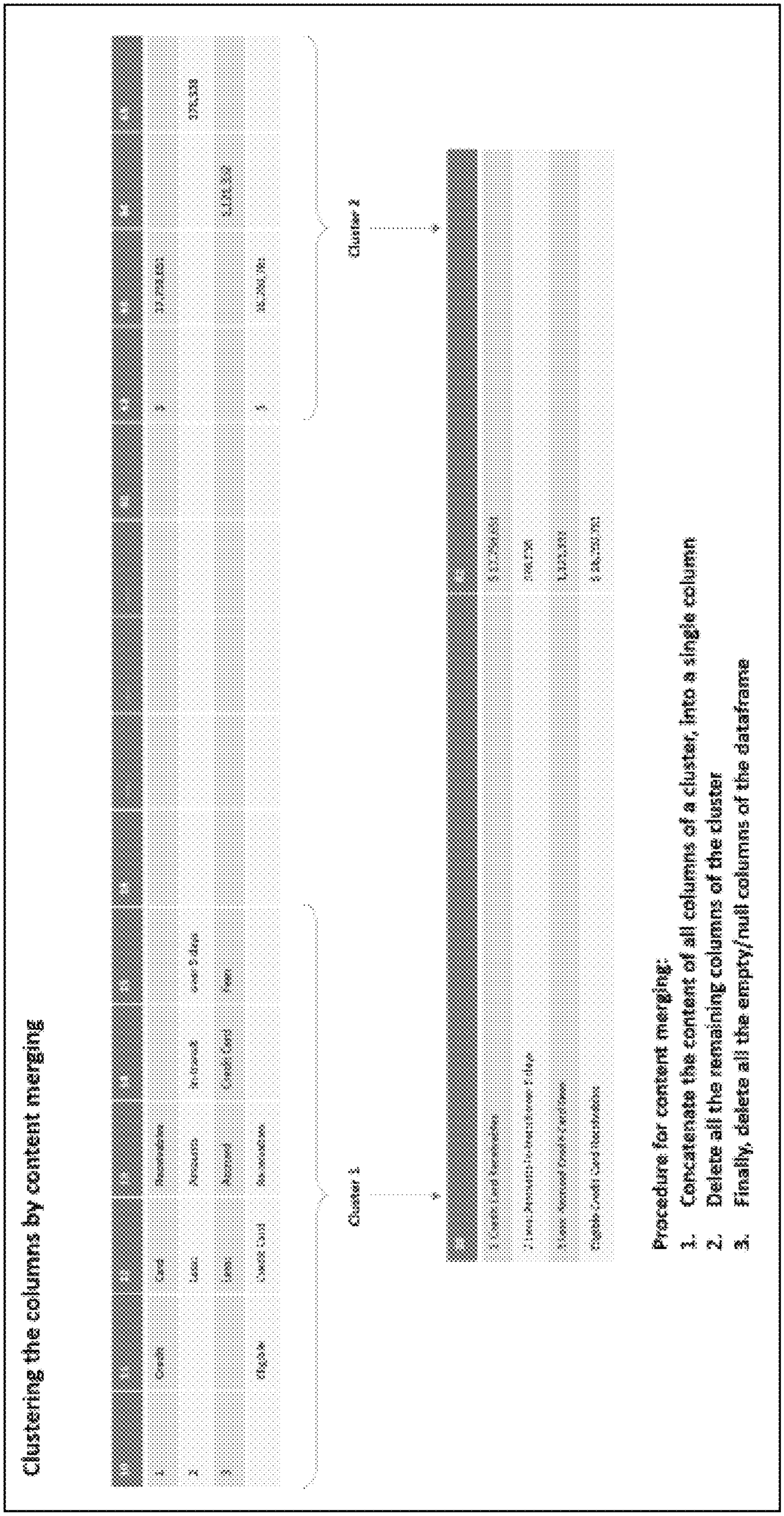
FIG. 4C illustrates an image of a final block of clustering the columns by content merging of the column clustering algorithm in accordance with the embodiments.

FIGS. 4A-4C illustrate images of the blocks of implementing the column clustering algorithm on the data extracted from a PDF document. FIG. 4A shows an image 400A of an initial block of mapping a bound box to dataframe columns. FIG. 4B shows an image 400B of an intermediate block of generating column clusters based on the ‘c’ value. FIG. 4C shows an image 400C of a final block of clustering the columns by content merging. The input parameter(s) for the column clustering algorithm may be a max cluster spread distance (c). The output results(s) for the column clustering algorithm may be a dataframe with columnar alignment as governed by the parameter ‘c.’

When the data extractor module 116 translates the x0 coordinates into dataframe columns for parsed tabular content, as shown in FIGS. 4A-4B, the content may be scattered across multiple dataframe columns. This scatter may be due to the different x0 values, as shown in FIG. 4A. However, the content belonging to the same column (as in the original PDF table) may be scattered very near to each other. The content that belongs to different columns (as in the original PDF table) may be placed farther away from each other. Hence, the parameter ‘c’ is the ‘intra-cluster spread distance’ of the content, as in the parsed dataframe directly created out of the bounding box values. As applicable, the same concept may be applied for rows as well with y0 co-ordinates. In that case, it translates to row clustering.

During operation, the data extractor module 116 may use a column clustering algorithm to calculate the content density of each column. To determine the column density, the algorithm may calculate, out of the total rows in a column, how many rows have non-null or non-empty content. The algorithm may identify the indices of columns with non-zero content density.

Starting from the first index, the algorithm of the data extractor module 116 may group together columns in a single cluster if the index values are within a difference of ‘c’ from each other. Although content related to a single column (as in the original PDF table) may be scattered in multiple columns (in parsed dataframe) (due to different x0), however, they may not be located too far from each other. Namely, the content of one column (as in the original PDF table) may be located in nearby x0 columns of the parsed dataframe, and the contents belong to different columns (as in the original PDF table).

For each of the clusters determined as described above, the algorithm may merge the contents of all columns into a single column. Thus, the algorithm may be capable of processing and reconstructing tabular content from PDFs regardless of whether the table is bordered or borderless. This is due to the fact that, in the embodiments, the algorithm may utilize bounding boxes and clustering parameters FIGS. 4A-4B provides an illustration of an example of the entire column clustering algorithm. FIG. 4C illustrates the final block of the column clustering algorithm where the resultant parsed dataframe may be obtained, such that it maintains the column alignment as in the original PDF document. For this, the ‘c’ value has to be set correctly, using the optimization process as described herein.

The information regarding the dynamics of the ‘c’ value may be used to obtain the columns in the dataframe. If the ‘c’ value is lower than the optimal value, the columns in resultant parsed dataframe may be distorted and content of the column may still be spread across multiple columns. If the ‘c’ value is higher than the optimal value, the columns in the resultant parsed dataframe may be squeezed up and the content of multiple columns may be merged into a single column.

Referring back to FIG. 1B, the data extractor module 116 may include a standard queries module 132 and a query result confidence module 134. The standard queries module 132 may be used to convert a natural language query into a standard query that a search engine can understand. Once the standard query is generated, a search, using the standard query, may be performed and one or more answer values may be received as a result of the search. The data extractor module 116 may extract the data from the PDF document into a structured format. The extracted data may be sent from the data extractor module 116 to the comparator module 120.

The comparator module 120 may be used to compare and verify data during the extraction process to ensure accuracy, consistency, and relevance. The comparator module 120 will be described in further detail below. The comparator module 120 may decide whether the extracted data meets the comparison criteria. The comparator module 120 may return the results to the data extractor module 116 where the query result confidence module 134 may score the results.

Namely, the data extractor module 116 may be used to validate the correctness of the information by querying the structured dataframe. First, the information/answer may be retrieved using standard structured queries. Then, the query result confidence module 134 may estimate the confidence or probability of the information/answer (received from the queries) being correct. This estimation may be performed using a Surrogate Model discussed in the following sections.

In various embodiments, the document analysis system 100B may include a primary LLM module 138, which may be configured as a generative AI model that identifies, extracts the relevant information, and generates a response back, all based on the input prompt and data. The input prompt may consist of questions. These questions may request certain values in the tabular content of the PDF. The data in the primary LLM module 138 may be obtained from a simple text extractor, which extracts text in a line-by-line manner from the PDF document.

Generative models, such as LLMs, are very capable of interpreting complex tabular data provided line-by-line. Some examples of LLMs that the primary LLM module 138 may be used according to the present disclosure include GPT-4®, BERT, T5, XLNet, and Turing-NLG. The primary LLM module 138 may interact with the ground truth extractor module 118 to generate ground truth data and with the surrogate model 140 to provide confidence scores for the extracted data.

In various embodiments, as shown in FIG. 1B, the functionality of a ground truth extraction module 142 and a ground truth confidence module 144 may be provided in both the primary LLM module 138 and the ground truth extractor module 118. As described above, the ground truth extractor module 118 may be a tool or algorithm designed to identify and retrieve the most accurate, verified, or authoritative data (referred to as the “ground truth”) from a dataset, for the purpose of training, evaluating, or validating machine learning models. The ground truth extractor module 118 may be used to ensure high-quality inputs for machine learning models, benchmarking, or any system that requires accurate and reliable reference data.

In embodiments, the system and method of the present disclosure may take advantage of the robust understanding capabilities of generative models as mentioned above. The primary LLM module 138 may also include the ground truth extraction module 142 which may be used to generate the ground truth. The ground truth may be generated by prompting the primary LLM module 138 to provide a set of correct (positive) information. A synthetic data generator module 146 may be another module provided in the primary LLM module 142.

The primary LLM module 142 may be used to generate additional data fields from the same PDF and/or other past PDFs to mimic the correct data distribution and generate incorrect (negative) information. The ground truth may be mixed with negative labels to serve as reference data, which may be used to train a surrogate model 140. The synthetic data generator module 146 may also help when retraining of the surrogate model 140 is required by generating additional data when tasked by the adaptive learning module described later. Further details of the synthetic data generator module 146 are described with regards to the description of the design details of an LLM confidence scoring.

A ground truth confidence 144 may be calculated and used in the primary LLM module 138 and the ground truth extractor module 118. When the surrogate model 140 is provided with a question, value, and context, the surrogate module 140 may return a probabilistic outcome, determining whether the value is a correct answer to the asked question and providing the context surrounding the value. This probabilistic outcome may be defined as the confidence in the correctness of the values of ground truth answers.

In FIG. 1B, the surrogate model 140 may be a secondary model developed to learn and replicate the behavior of the primary LLM module 138. The surrogate model 140 may provide probabilistic confidence outcomes for the extracted data by evaluating the question, value, and context. The surrogate model 140 may return a probabilistic outcome determining whether the value is a correct answer to the asked question given the context surrounding the value. This probabilistic outcome may represent the confidence in the correctness of the ground truth answers. In FIG. 1B, the results from the surrogate model 140 and the comparator 120 may be fed back into the data extractor module 116 to generate confidence scores by the query result confidence module 134. The result of the query result confidence module 134 may be returned to the comparator 120 with an error correction module 150 to adjust extraction parameters based on a reconstruction loss calculation 148.

In the embodiments of FIG. 1B, the comparator module 120, as described above with regard to FIG. 1A, may be used to compare and verify data during the extraction process to ensure accuracy, consistency, and relevance. The comparator module 120 may act as a decision-making component that evaluates the extracted data against predefined criteria, standards, or other data sources to make judgments about whether the data is correct, relevant, or meets the required specifications.

In FIG. 1B, the comparator module 120 may include the reconstruction loss calculation 148 and the error correction module 150. The reconstruction loss calculation 148 is a measure of error or loss that compares the ground truth answers and confidence with the answers and confidence from the data extractor module 116. This loss measure indicates how well the data extractor module 116 has performed in reconstructing the tabular content from PDF documents. The reconstruction loss calculation 148 will be minimal if the output of the data extractor module 116 has correctly maintained the structural integrity of most rows, columns, cells, and values. The reconstruction loss calculation 148 may cause the error correction module 150 to adjust the parameters of the data extractor module 116 iteratively, minimizing the reconstruction loss and improving the accuracy of the extracted tables.

In various embodiments, the surrogate model 140 may be configured to make at least two confidence determinations. First, the surrogate model 140 may return a surrogate model confidence for correctness of responses to the primary LLM module 138 for the ground truth value. The ground truth value is denoted by GT. The confidence is denoted by CGT.

Second, the surrogate model 140 may return a confidence for correctness of answers to the structured queries on the extracted data. The answer (Response Value) to queries on the extracted data is denoted by ED. The confidence is denoted by CED.

One exemplary expression defining a relationship between these factors is shown in the equation below:

The Reconstruction Loss Function is defined as:

$$\text{minimize } \Sigma[(GT-ED)^2+\lambda(CGT-CED)]$$

where: Σ is performed over the entire dataset $(GT-ED)^2$ ensures correctness of the actual value (CGT−CED) ensures that data extractor module becomes as confident (CCEEEE) as a generative Model (CCGGGG)

λ: Control Parameter to tune impact of (CGT-CED)

λ: is any non-zero positive value

The loss function tries to reach a minimum where the confidence of information retrieval from ED is equal to that of GT. In other words, information extraction by simply querying the ED provides results as good as receiving responses from a generative AI model.

If λ is 0, then this setup becomes the standard MSE error.

Minimizing just (GT-ED) provides the data extractor module the correct values (by ensuring ED=GT towards the end of gradient descent learning iterations). However, this calculation by itself may not be able to ensure whether the data extractor module is as confident (CCEEEE) as the generative Model (CCGGGG) to retrieve the value ED.

If the reconstruction loss calculation 148 is high, this means that there is a need to use the error correction module 150 to adjust the parameters of the data extractor module 116. The error correction module 150 may receive the high reconstruction loss calculation 148 as input and adjusts the parameter values of the data extractor module 116 using an optimization-based approach. The error correction module 150 may operate in a gradient descent manner, retriggering the data extractor module 116 until the reconstruction loss calculation 148 is reduced. The error correction module 150 may ensure that the extracted tables are as accurate as possible by continuously refining the extraction parameters. The error correction module 150 may interact with the data extractor module 116 and the reconstruction loss calculation 148 to achieve optimal extraction results.

In FIG. 1B, the adaptive learner module 122 may be triggered in response to a high reconstruction loss calculation 148. In addition to triggering the error correction module 150 for the entries with high reconstruction loss calculation 148, these entries may also be sent to the adaptive learner module 122. The adaptive learner module 122 may include a monitoring module 152 and a retraining/reinstruct trigger module 154. The monitoring module 152 may trigger an alert and activate the adaptive learner module 122. In response, the adaptive learner module 122 may receive more synthetic data from the primary LLM module 138 and the synthetic data generator module 146 as suitable.

The adaptive learner module 122 may instruct the primary LLM module 138 to generate better ground truth for such samples. The adaptive learner module 122 may use the retraining/reinstruct trigger module 154 to retrain the surrogate model 140 on the received synthetic data. Thus, the adaptive learner module 122 may be configured as a self-sufficient, self-correcting, and minimal human intervention mechanism that may be capable of adapting the entire framework continuously to a new set of PDF documents as needed.

The adaptive learner module 122 may continuously adapt the entire framework to new data, ensuring minimal human intervention. The adaptive learner module 122 may monitor the performance of the models and trigger retraining when the monitoring module 152 detects a high reconstruction loss calculation 148. The adaptive learner module 122 may receive more synthetic data from the synthetic data generator module 146 and instruct the primary LLM module 138 to generate better ground truth for problematic samples. The adaptive learner module 122 may use the retraining/reinstruct trigger module 154 to retrain the surrogate model 140 on the new data, ensuring the system remains accurate and reliable over time. The adaptive learner module 122 may interact with the error correction module 150, the synthetic data generator module 14, and the primary LLM module 138 to maintain the document analysis system's 100B performance and adaptability.

In FIG. 1B, an embodiment may provide AI/ML training 158 in a cloud environment 156 that may involve a multi-block process including a model training module 160 and a model provisioning module 162.

The model training module 160 may involve the process of teaching an ML algorithm to recognize patterns in data and make predictions or decisions based on that data. In the cloud environment 156, the model training module 160 may involve data preparation. The data must be cleaned, preprocessed, and transformed into a format suitable for training. The cloud environment 156 platforms may provide scalable storage and computational power for large datasets.

The model training module 160 may perform model development. The model may be developed by selecting the appropriate machine learning algorithms, tuning hyperparameters, and designing the architecture, whether it is supervised, unsupervised, or reinforcement learning.

The model training module 160 may train the surrogate model on cloud resources, for example, GPUs (Graphics Processing Units) and TPUs (Tensor Processing Units), which may be employed for training complex AI models, such as deep learning models. These resources may enable faster processing of large datasets and more sophisticated model training techniques, such as distributed training, where models are trained across multiple machines to reduce time.

The model training module 160 may implement experimentation and iteration. In the cloud platforms, tools are provided that may be used by the model training model 160 to experiment with different models, hyperparameters, and algorithms. In various embodiments, this iterative process may be aided by tools like machine learning pipelines, which may help to fine-tune the model to achieve optimal performance.

The model provisioning module 162 may be implemented once the model has been successfully trained and validated, the next block may be model provisioning, which may involve deploying the model to a production environment so it can be used for real-time inference or predictions. In the cloud environment 156 setting, the model provisioning module 162 may include model deployment. In the embodiments, the trained surrogate model may be packaged into a deployable format (e.g., containerized services or serverless functions) and deployed to the cloud. According to some embodiments, the model provisioning module 162 may use cloud services, such as AWS SageMaker®, Google® AI Platform, or Azure® Machine Learning offer seamless deployment options that support various model types and deployment architectures.

The model provisioning module 162 may provide scalability. Cloud platforms provide auto-scaling features, that allow the model provisioning module 162 to handle increasing loads by automatically provisioning additional resources. This may ensure that the model provisioning module 162 may serve predictions in real-time, even under heavy traffic or when demand spikes.

The model provisioning module 162 may facilitate versioning and updates. As new data becomes available or as the surrogate model 140 may need optimization, the cloud services may allow easy versioning of the models and automate updates without disrupting service. This may help to maintain the surrogate model 140 accuracy over time.

The model provisioning module 162 may implement monitoring and maintenance. Cloud-based monitoring tools may track the surrogate model's performance in production, ensuring that it continues to provide accurate predictions. These tools may detect issues such as data drift (when the incoming data distribution changes), triggering automatic retraining or model updates when necessary.

In FIG. 1B, a logging module may be provided to create and record event data within the document analysis system 100B, where these events may be captured and stored in a centralized logging service, allowing for later analysis and monitoring of system behavior, usually including details like timestamps, severity levels, and specific actions taken within the application or infrastructure. Each entry may contain information about a specific event that occurred.

In an embodiment, at a broader level, the document analysis system 100B may comprise five major building blocks including a parameter-driven data extractor, a generation of ground truth and synthetic data using generative AI, a surrogate model-augmented response validator, a reconstruction loss minimization, and adaptive learning and monitoring.

According to various embodiments, the framework 114 may be configured to address and resolve the following problems:

One problem may be the detection of incorrect and hallucinatory responses from generative models: A response (answer to a question) generated by a generative model may either be correct or incorrect. This response may be based solely on the question asked and the context available in the current data. Context herein refers to the context present before and after the answer in the data. The system and method of the present disclosure translate this into a binary classification problem where:

Target Label: Is the response correct or incorrect (i.e., 1 or 0 respectively)?

Decision Variables: Question, Context, Response

Mathematical Formulation:

The embedding function is denoted as Emb( )

$$Y=f1(X\_1,X\_2,X\_3)$$

Where:

(Y)=Target Label (X_1)=Contextual Embedding for Question (Q)=Emb(Q)

(X_2)=Contextual Embedding for Context (CT)=Emb (CT)

(X_3)=Contextual Embedding for Answer of Generative AI Model=Emb(A)

such that:

$$A=f2(P)$$

where:

P=Input Prompt such that $$P=f3(Q,T)$$

where:

Q=Question

T=Text String of Extracted Data

The resultant Learning Function is:

$$Y = f1(\mathrm{Emb}(Q), \mathrm{Emb}(CT), \mathrm{Emb}(A))$$

which can be re-written as below by substituting A:

$$Y = f1(\mathrm{Emb}(Q), \mathrm{Emb}(CT), \mathrm{Emb}(f2(f3(Q,T)))$$

As evident above, the target label/variable is simply a non-linear decision function of Question (Q), Data (T), Context (CT) only.

X_1 denotes the question

X_3 denotes the answer of the generative model, but it encapsulates the relationship between Question and the Data indirectly.

X_2 denotes the significance of Context as a key feature. Context is basically defined as the relevant slice of data (T) around (A)

Y will be close to 0 if there is an inconsistency or lack of coherence amongst Q, A, CT and indirectly amongst Q, T, CT. As A is a function of Q, T.

Incorrect A for a Q will be signified by the generative model fetching an A from irrelevant CT out of T. This provides the exemplary dynamics between Q, A, CT, T.

Such a pattern is a highlight of Class 0 i.e., incorrect responses, or in other words, resulting in A with less confidence of being correct.

The resulting model may be termed as the surrogate model 140, which may operate in parallel to both the original generative AI model and the data extractor algorithm.

Another conventional problem addressed by the present disclosure may be the detection of incorrect responses from structured queries on the extracted data. Currently, there is no technique to probabilistically determine the validity of responses to structured queries executed on data extracted by a data extractor. This means there is no method to identify how well or poorly any data extractor algorithm has performed in reconstructing data from the source PDF. In addition, there is no method to identify the correctness of the answers to structured queries fired on the extracted data. The surrogate model 140 described herein may be used to identify the extent or confidence of correctness for the query response. Thus, the surrogate model may act as a confidence detection mechanism for both the generative models and data querying on the extracted data.

An additional conventional problem addressed by the present disclosure may be the translation of question-and-answer (Q&A) problems for tabular content-heavy PDF documents into simple structured query. The present disclosure proposes a technique to tune data extraction algorithms using a learning-based approach by minimizing reconstruction error.

Once the reconstruction error reaches its minimum, the tabular data resulting from the data extraction algorithm may closely align with the structure and alignment of the original PDF. Consequently, information extraction from this data may translate to using standard structured queries. This approach may avoid the necessity of relying completely on generative AI models for information extraction. The answers generated by these queries may be verified by the surrogate model 140, which assigns a probability of the answer being correct.

The fourth conventional problem addressed by the present disclosure may be a state-of-the-art ensemble of conventional data extractor, traditional ML, and generative model. The present disclosure proposes a state-of-the-art ensemble of conventional data extractors, machine learning and generative AI. Quality or performance of the data extraction algorithm may be ensured by the generative AI model. The quality or performance of the generative AI model may be ensured by a surrogate model 140 trained on contextual embeddings based on data generated by the synthetic data generation module 146.

This advantage may increase the efficiency and adaptability of conventional data extractors to complex use cases. This advantage may also enable the use of the data and language understanding capabilities of generative AI models to generate ground truth datasets. This advantage may also remediate the hallucinations and incorrect answers that may be produced by generative models. This advantage may also enable the use of data to learn decision boundaries and distinguish between correct and incorrect responses of generative AI models, providing contextual embeddings as features.

Yet another conventional problem addressed by the present disclosure may be the continuous updating of the surrogate model and generative AI prompts (adaptive learning). Once deployed to production, any conventional ML/AI model may be susceptible to data drift. The performance of models usually degrades over time either because the statistical nature of incoming data differs from the training data or due to high bias developed during model training, which tends to ignore certain detailed features.

In the system and method of the present disclosure, if the framework detects significant high reconstruction loss or a significant decrease in the confidence levels of the ground truth generated by the primary LLM module 138, a trigger may be sent to adapt and retrain both the primary LLM module 138 and the surrogate model 140. This may ensure continuous adaptation and improvement of the models to maintain accuracy and reliability.

By addressing these key challenges, the system and method of the present disclosure may provide a holistic framework that not only ensures accurate data reconstruction and extraction but also determines the measure of confidence in the responses generated by generative models. This approach may enhance the capabilities of automated data extraction systems and may ensure their widespread adoption and effectiveness in real-world applications.

Various embodiments may provide a primary model and a secondary model. In various embodiments, the present disclosure may introduce a novel and systematic approach to address these conventional deficiencies by incorporating a parallel or surrogate model designed to enhance the reliability and accuracy of confidence estimation for extracted values. The primary LLM module 138, which functions as the primary model that performs the extraction, may be referred to as the "ORIGINAL" model. In addition, the secondary model, which may be developed to learn and replicate the behavior of the "ORIGINAL" model, may be referred to as the surrogate model 140. The present disclosure may provide a comprehensive confidence-generating system for extracted values by ORIGINAL model.

Figure 5A:
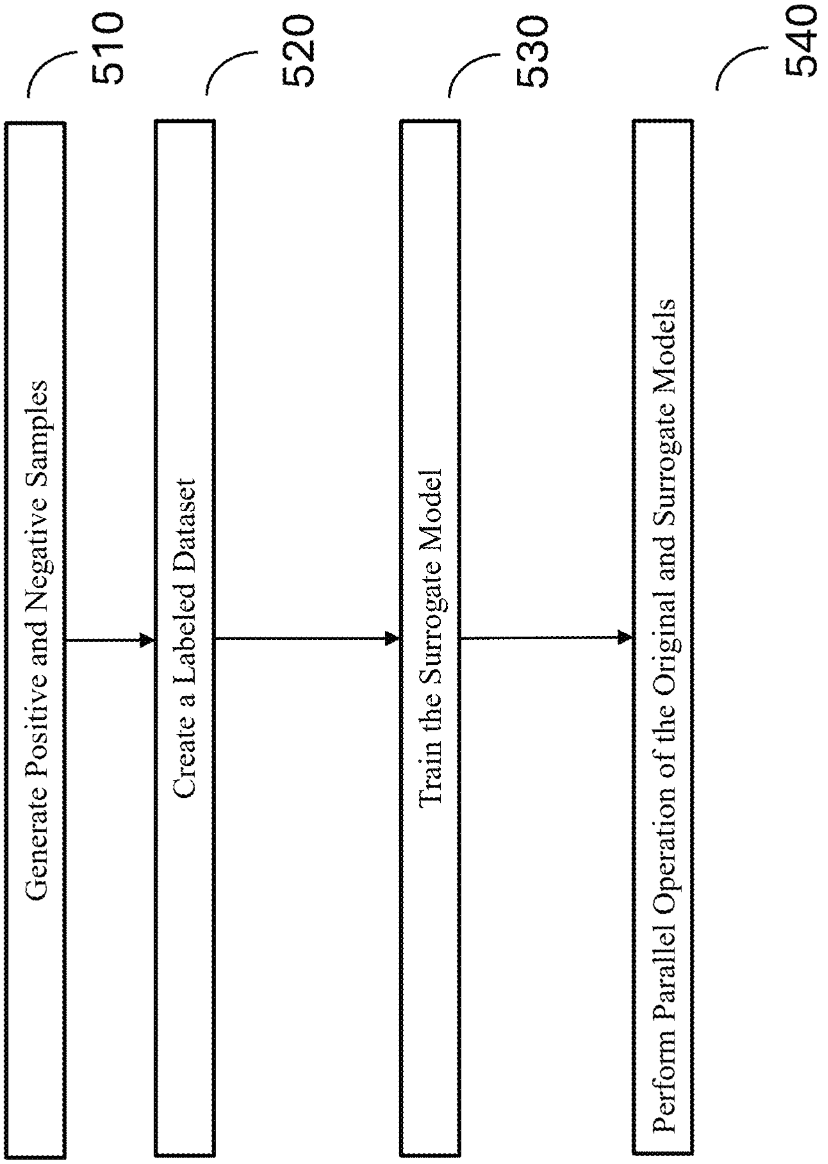
FIG. 5A illustrates an exemplary flow diagram of a confidence scoring process implemented by a surrogate model in accordance with embodiments of the present disclosure.
Figure 5B:
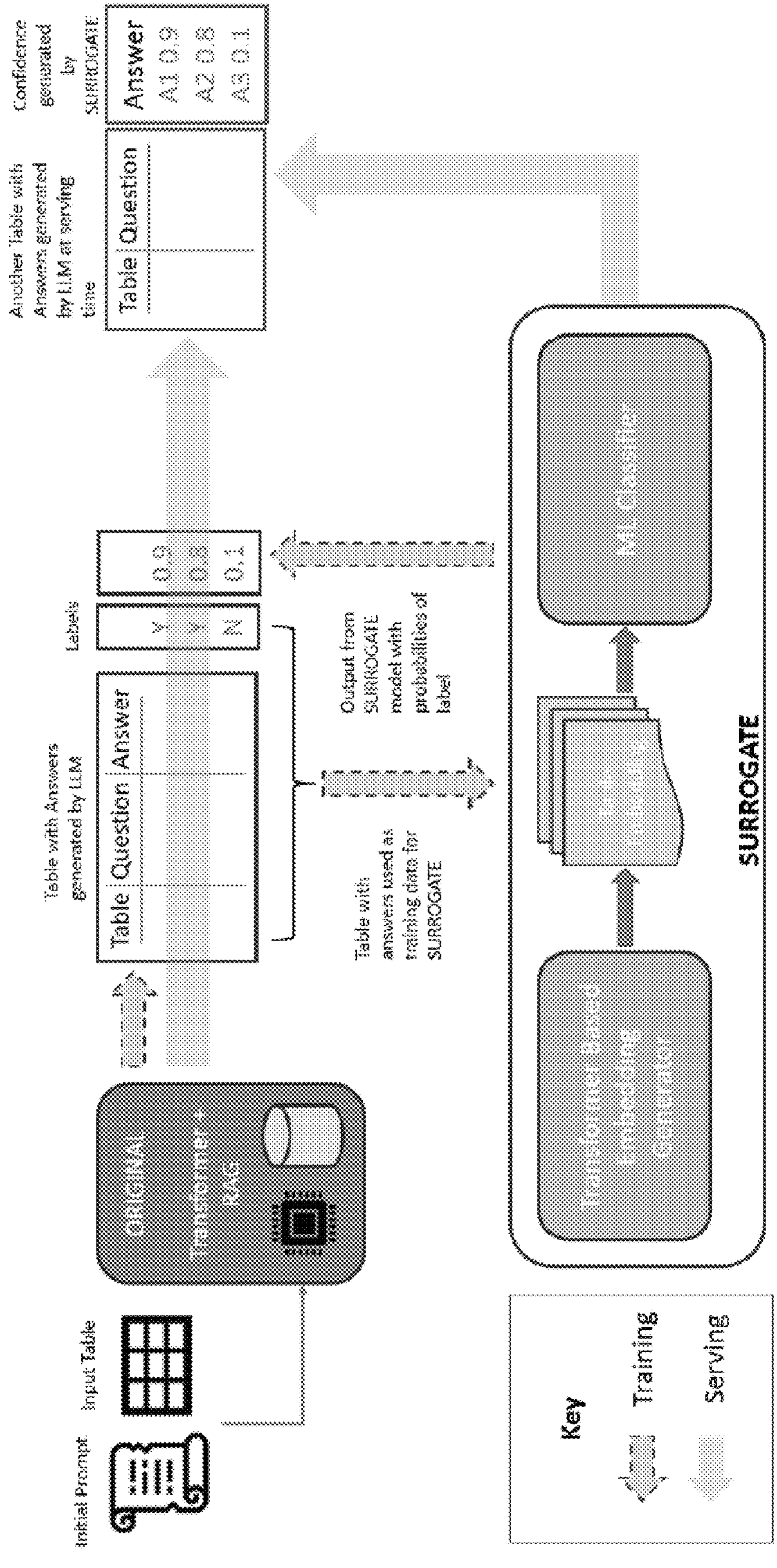
FIG. 5B illustrates a high level diagram of the surrogate model as implemented by the process in FIG. 5A in accordance with the embodiments.

An exemplary implementation of the confidence scoring process by the surrogate model 140 is illustrated in the flow diagram 500A of FIG. 5A. FIG. 5B illustrates a high-level diagram 500B of the surrogate model 140 as implemented by the process in FIG. 5A.

In block 510, the process may generate positive and negative samples. Initially, the ORIGINAL model may be prompted to generate both correct (positive) and incorrect (negative) question-answer pairs from the provided table in the PDF document. A positive sample may be defined as a question-answer pair where the answer is correct and derived accurately from the table. Conversely, a negative sample may be defined as a pair where the answer is incorrect, either by selecting an erroneous value from the table or by generating a hallucinated response not present in the table.

To simulate hallucinatory behavior, at block 510 the process may introduce an additional block where some negative answers are randomly flipped by sampling with a low probability (x, say 0.1). This may be achieved by generating a random number and replacing the negative answer with a hallucinatory response if the number falls below the specified probability x. This strategic approach may ensure a diverse set of wrong answers, which may be beneficial for modelling purposes and addresses the hallucination issue inherent in current generative models as a byproduct of their designs.

In block 520, the process may create a labeled dataset. Each table in the PDF document may yield numerous pairs of correct and incorrect values, resulting in an extensive labelled dataset. For each row, a question-answer pair may be assigned a label: 'Y' for correct and 'N' for incorrect. This labelled dataset may delineate the characteristics of correct and incorrect answers, forming a robust training set for subsequent modelling.

In block 530, the process may train the surrogate model 140. The surrogate model 140 may comprise at least two integral components: an embedding generator and a classifier. The embedding generator may leverage a transformer-based model to convert the table, questions, and answers into dense vector representations (embeddings). These embeddings may encapsulate the semantic and contextual information necessary for accurate classification.

In the subsequent classification stage, the surrogate model 140 may be trained to act as a classifier that predicts the label ('Y' or 'N') for each question-answer pair based on the generated embeddings. The classifier may be trained to discern between correct and incorrect answers by analyzing the embeddings of the table, question, and answers.

In block 540, the process may perform parallel operation of the ORIGINAL model (i.e., the primary LLM module 138) and surrogate model 140. Post-training of the surrogate model 140 may operate concurrently with the ORIGINAL model. Upon the extraction of an answer by the ORIGINAL model, the surrogate model 140 may evaluate the table and question to predict the label ('Y' or 'N') and may compute a corresponding probability. This probability may represent the confidence level in the correctness of the extracted answer.

By operating surrogate model 140 in parallel with the ORIGINAL model, the document analysis system 100B may deliver a reliable confidence estimate for each extracted answer. This dual-model architecture may mitigate the prevalent overestimation issues and enhance the overall robustness and reliability of the table extraction processes.

The implementation of the confidence scoring process by the surrogate model 140 may provide several benefits. For example, the first benefit may be cost-effectiveness. The document analysis system 100B may be inexpensive to operate as it does not require additional data beyond what is already utilized for training the ORIGINAL model.

Another benefit provided by the system and method may be data efficiency. The document analysis system 100B may leverage the same data used to train the ORIGINAL model, thereby eliminating the need for additional data collection or generation.

A further benefit may be the mitigation of hallucinations. As an added benefit, the surrogate model 140 may learn to express low confidence in hallucinatory answers. By allowing the model to hallucinate during the initial sample generation stage, the surrogate model 140 may be trained to recognize and appropriately respond to hallucinated answers, thereby enhancing the system's long-term reliability.

An additional benefit may be enhanced confidence estimation. The surrogate model 140 may provide an additional layer of validation, ensuring that the confidence levels associated with the extracted answers are more accurate and reliable.

By implementing the novel approach, the present disclosure may significantly improve the accuracy and reliability of confidence estimates for answers extracted from complex tables in documents, PDFs, and other sources. This comprehensive system may address and rectify the shortcomings of existing methodologies, thereby providing a robust solution for confidence generation in the context of table extraction using generative models.

FIGS. 6A-6G illustrate an example of a PDF document, which is input into the document analysis system 100B for information extraction and confidence determination. In FIGS. 6A-6G, one of the goals may be to query or ask the primary LLM module 138 (as the ORIGINAL model) about certain information from the PDF document 600A in FIG. 6A. Then, the surrogate model 140 may be used to return a confidence score for the answer of the primary LLM module 138.

At first, the primary LLM module 138 may be instructed to identify all the tables in the PDF document 600A. FIG. 6B illustrates the output 600B where the primary LLM module 138 may successfully identify and list all the tables present in the original document 600A.

In the next block, questions may be asked to the primary LLM module 138. Here, the primary LLM module 138 may be prompted to return correct and incorrect answers for each question. In addition, the primary LLM module 138 may be instructed to return the name of the relevant table from which it extracted each value.

In FIG. 6C, the results may be combined, and a labeled dataset 600C of Yes/No may be prepared. The responses labeled a "No" are incorrect responses. The responses labeled as "Yes" are correct responses.

In the next block, relevant context from the table may be extracted. This means—in the labeled dataset of FIG. 6C, from the row with index 10, the answer $92,903 was extracted from the table. However, as shown in FIG. 6C, the table has multiple entries. So, in this block, the primary LLM module 138 may now be prompted to retrieve only the relevant few rows of context around this value of $92,903 in the table of FIG. 6C.

The primary LLM module 138 output 600D is shown in FIG. 6D. The primary LLM module 138 has correctly extracted the context consisting of 1 row above and below the value $92,903 in the table.

In the next block, transformer-based contextual embeddings may be generated for each of the—Question, Answer values, Table context. And the target variables for the surrogate model 140 are the labels Yes/No.

For example, the transformer-based contextual embeddings may be 768 dimensional embeddings. Hence, each row may be a collection of three (3) embeddings 600E—one for each question, answer value and table context as shown in FIG. 6E.

The surrogate model 140, when trained on the dataset with X as embeddings and Y as binary Yes/No, may produce the probabilistic outcome shown in FIG. 6E stating that the confidence score for an answer value, for a question, and given the table context.

The trained surrogate model 140 may be applied on another document 600F as shown in FIG. 6F.

Figure 6G:
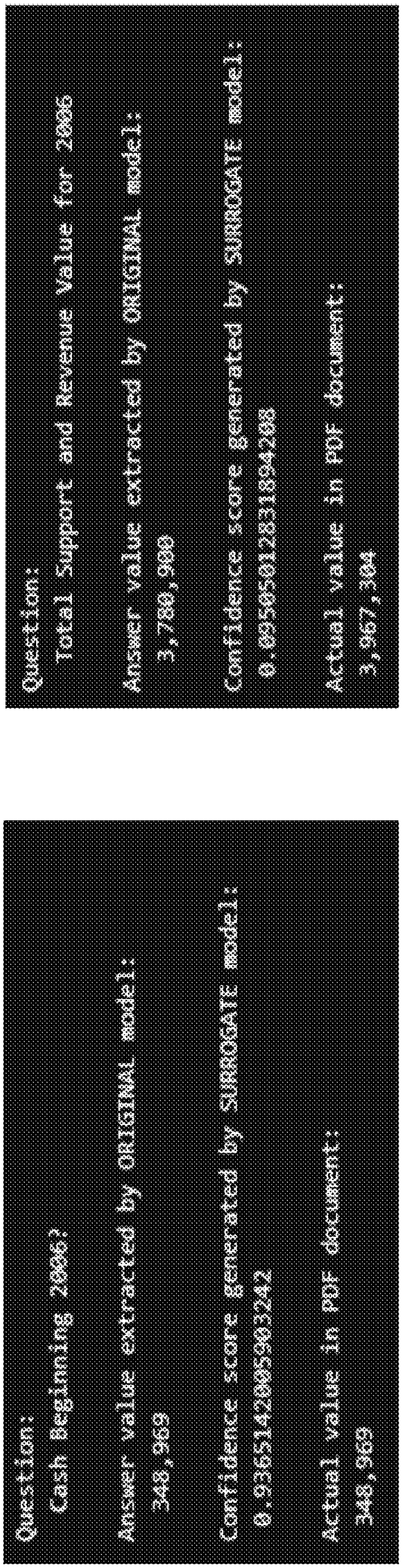

FIG. 6G illustrates a sample output 600G from the surrogate model 140, indicating the confidence scores for both correct and incorrect responses.

FIG. 2 illustrates a flow diagram of an exemplary method 200 for extracting tabular data from PDF documents into an Excel® format, in accordance with the embodiments. In an embodiment, method 200 may employ the framework 114 to implement converting the data from the PDF document and extracting the data into the Excel® format.

At block 202, the process may receive one or more PDF documents at the PDF datastore. The PDF datastore may be configured as a secured storage where PDF documents are stored from business applications. The PDF documents may be scanned or searchable documents.

At block 204, the process may use, for example, a parameter-based data extraction algorithm to extract and reconstruct tabular content from the PDF document into a structured dataframe. The parameter-based extraction algorithm may read bounding box information from PDF documents. The set of parameters may govern key aspects of the algorithm that impact the end result, i.e., the parsed document. As mentioned earlier, one of the end goals of the system and method of the present disclosure is to provide a mechanism capable of obtaining an optimal set of parameter values for the extraction algorithm, which may consequently lead to the parsed data being very close to that in the original PDF document. Various embodiments may use a custom data extraction algorithm; however, in other embodiments, this may be replaced by any other PDF to Excel extraction algorithm as well. The end result of the data extraction block is the production of an Excel file containing the tabular content from the original PDF document.

In addition, in various embodiments, parsed data querying may be performed. The Excel® file containing the parsed content may be read into program memory as a dataframe. This dataframe may be similar to a conventional database table where values may be extracted by querying the rows and columns by structured query language (SQL)-like techniques. By querying the dataframe, a list of queries and results may be generated. The queries may be requests for certain data values from the tables in dataframe, and the results may contain the extracted values from the dataframe. Depending on the influence of the parameter values of the corresponding extraction algorithm, the result values obtained by querying may be either correct or incorrect. For every query, the ground truth value may be generated, as described in the further block of loss minimization and parameter optimization in blocks 226-230.

At block 206, the extracted data may be received from the data extractor to be validated by a validator module (i.e., a comparator in FIG. 1B). The validator module may validate the correctness of the information received by querying the structured dataframe from the data extraction algorithm. The validator may be a module that validates the correctness of the information extracted by the data extraction algorithm. The validator may operate in two levels: Level 1—standard queries and Level 2—confidence score. In Level 1, the validator may retrieve information using standard structured queries, such as SQL-like queries, to ensure the extracted data is accurate. In Level 2, the validator may estimate the confidence or probability of the information being correct using a surrogate model at block 212. The validator ensures that the extracted data is both accurate and reliable before the extracted data is used for further processing or decision-making.

At block 208, level 1 of the validator may involve retrieving information using standard structured queries. These queries may be designed to extract specific values from the structured dataframe generated by the data extraction algorithm. The queries may be SQL-like or other structured query formats that allow for precise data retrieval. This level may ensure that the extracted data is accurate and corresponds to the expected values in the original PDF document.

At block 210, level 2 of the validator may involve estimating the confidence or probability of the information being correct. This estimation may be performed using a surrogate model at block 212, which may evaluate the extracted data and provide a probabilistic outcome indicating the correctness of the values. The confidence score may help in assessing the reliability of the extracted data and ensure that only high-confidence data is used for further processing.

At block 214, the process may use a loss function to compare the ground truth answers and confidence with the extracted data. The loss function may cause the validator to adjust the parameters of the data extraction algorithm iteratively, minimizing the reconstruction loss and improving the accuracy of the extracted tables. The loss function may ensure that the extracted data maintains the structural integrity and accuracy of the original PDF document.

At block 218, the process may apply a primary LLM module that may be configured as a generative AI model that identifies, extracts the relevant information, and generates a response back, all based on the input prompt and data. The input prompt may consist of questions. These questions may request information for certain values in the tabular content of the PDF. The data at the primary LLM module may be obtained from a simple text extractor, which extracts text in a line-by-line manner from the PDF document. Generative models, such as LLMs, are highly capable of interpreting complex tabular data provided line-by-line, even if the text extractor has shortcomings.

At block 220, the process may generate the ground truth data. The process may take advantage of the robust understanding capabilities of generative models as mentioned above, the primary LLM module may be used to generate ground truth data. The ground truth data may be generated by prompting the primary LLM module to send back a set of correct (positive) information. Another module, which may be a synthetic data generator module, may generate additional data fields from the same PDF document and/or other past PDFs to mimic the correct data distribution and generate incorrect (negative) information. At block 220, the process may mix the ground truth data with negative labels to serve as a reference data using at block 222 a surrogate model which is trained. The synthetic data generator module may also help when retraining of the surrogate model is required by generating additional data when tasked by the adaptive learning module.

At block 222, the process may learn and replicate the behavior of the primary LLM module using the surrogate model. The surrogate model may provide probabilistic confidence outcomes for the extracted data by evaluating the question, value, and context. The surrogate model may return a probabilistic outcome determining whether the value is a correct answer to the asked question given the context surrounding the value. This probabilistic outcome may represent the confidence in the correctness of the ground truth answers. The surrogate model may interact with the validator to provide confidence scores and with an error correction module (at block 230) to adjust extraction parameters based on reconstruction loss.

At block 224, the process determines a ground truth confidence by the surrogate model 140 when provided with a question, value, and context. The surrogate model 140 may return a probabilistic outcome indicating whether the value is a correct answer to the asked question given the context surrounding the value. This probabilistic outcome represents the confidence in the correctness of the ground truth answers. The ground truth confidence may be used to ensure that the extracted data is reliable and may be used for further processing.

At block 226, the process uses a comparator, also known as a reconstruction loss, which is a measure or error/loss to compare the ground truth answers and confidence with the answers and confidence from the data extraction algorithm. This loss measure may indicate how well the data extraction algorithm has performed in reconstructing the tabular content from PDF documents. The reconstruction loss will be minimal if the output of the data extraction algorithm has correctly maintained the structural integrity of most rows, columns, cells, and values. The reconstruction loss may cause the error correction module to adjust the parameters of the data extraction algorithm iteratively, minimizing the reconstruction loss and improving the accuracy of the extracted tables.

At block 228, when low reconstruction loss is detected, the process may output the final extraction of the data extraction algorithm after the validation and error correction processes. This final output may be a structured dataframe that accurately represents the tabular content of the original PDF document. The final extraction may be achieved after the data extraction algorithm has been refined and optimized to minimize reconstruction loss and ensure high accuracy.

At block 230, when high reconstruction loss is detected, the process may use the error correction module and take the high reconstruction loss as input and adjust the parameter values of the data extraction algorithm using an optimization-based approach. The error correction module may operate in a gradient descent manner, retriggering the data extraction algorithm until the reconstruction loss is reduced. The error correction module may ensure that the extracted tables are as accurate as possible by continuously refining the extraction parameters. This module may interact with the data extraction algorithm and the reconstruction loss to achieve optimal extraction results.

Namely, blocks 226-230 perform the loss minimization and parameter optimization process where the results obtained by the parsed data querying may be compared with the corresponding ground truth values. The difference between both values may be termed as the "reconstruction error." This is because such an error value may depict the difference between the actual tabular content and the tabular content as reconstructed by the extraction algorithm. As the values extracted from tables are numerical in nature, mean square error may be used to calculate the final "reconstruction mean square error" value.

In various embodiments, a gradient descent technique may be used to minimize the "reconstruction mean square error," where the gradient may be traversed in the direction of loss minimization with respect to the parameter values of the extraction algorithm. Such an optimization technique may eventually (after a number of epochs) converge at the optimal set of parameters for the data extraction algorithm. Accordingly, the result of the loss minimization and parameter optimization process is the optimal parameter set for the extraction algorithm, such that the "reconstruction error" is minimal for any given document, without human intervention or trial-and-error.

Figure 7A:
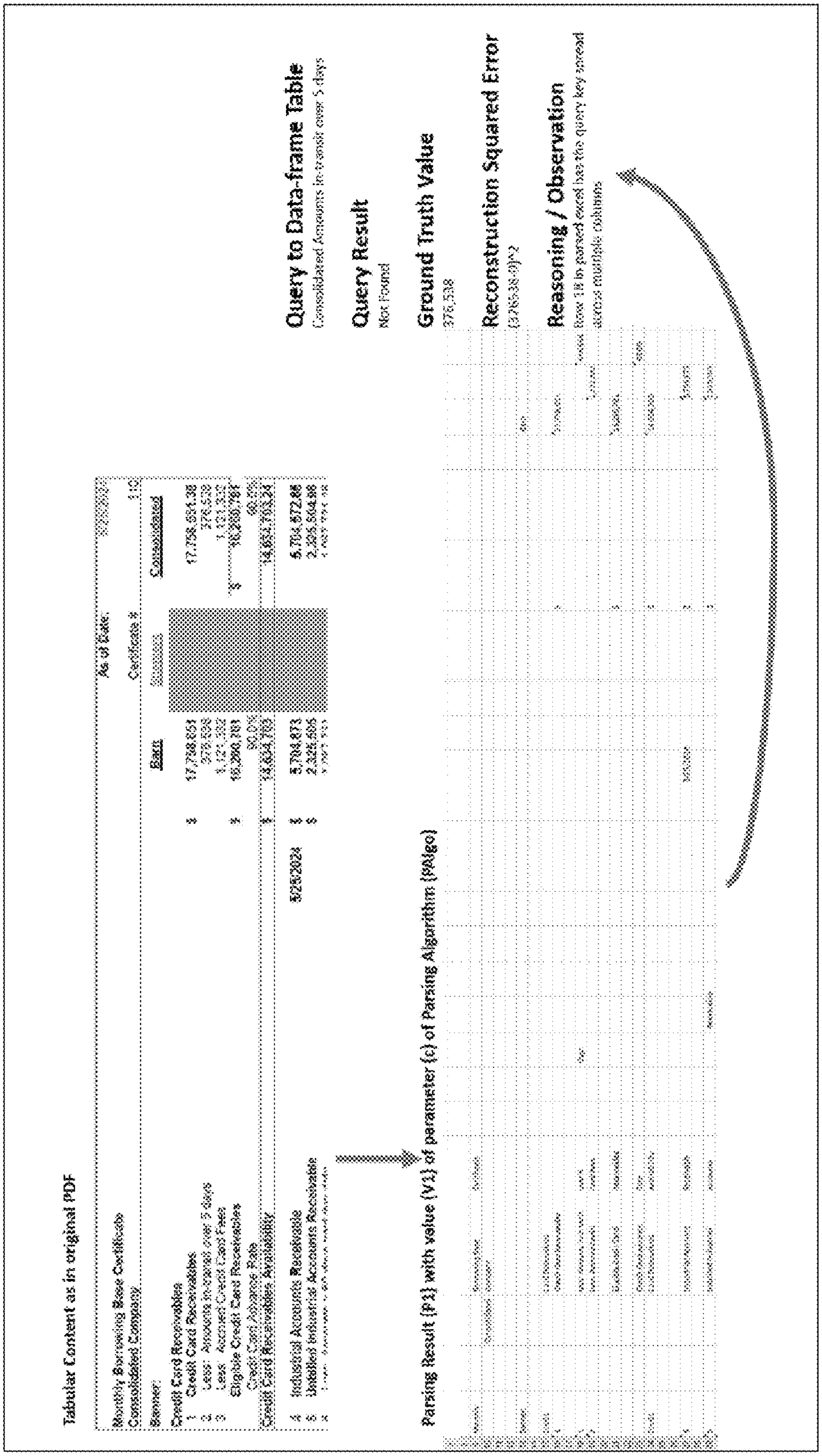
Figure 7B:
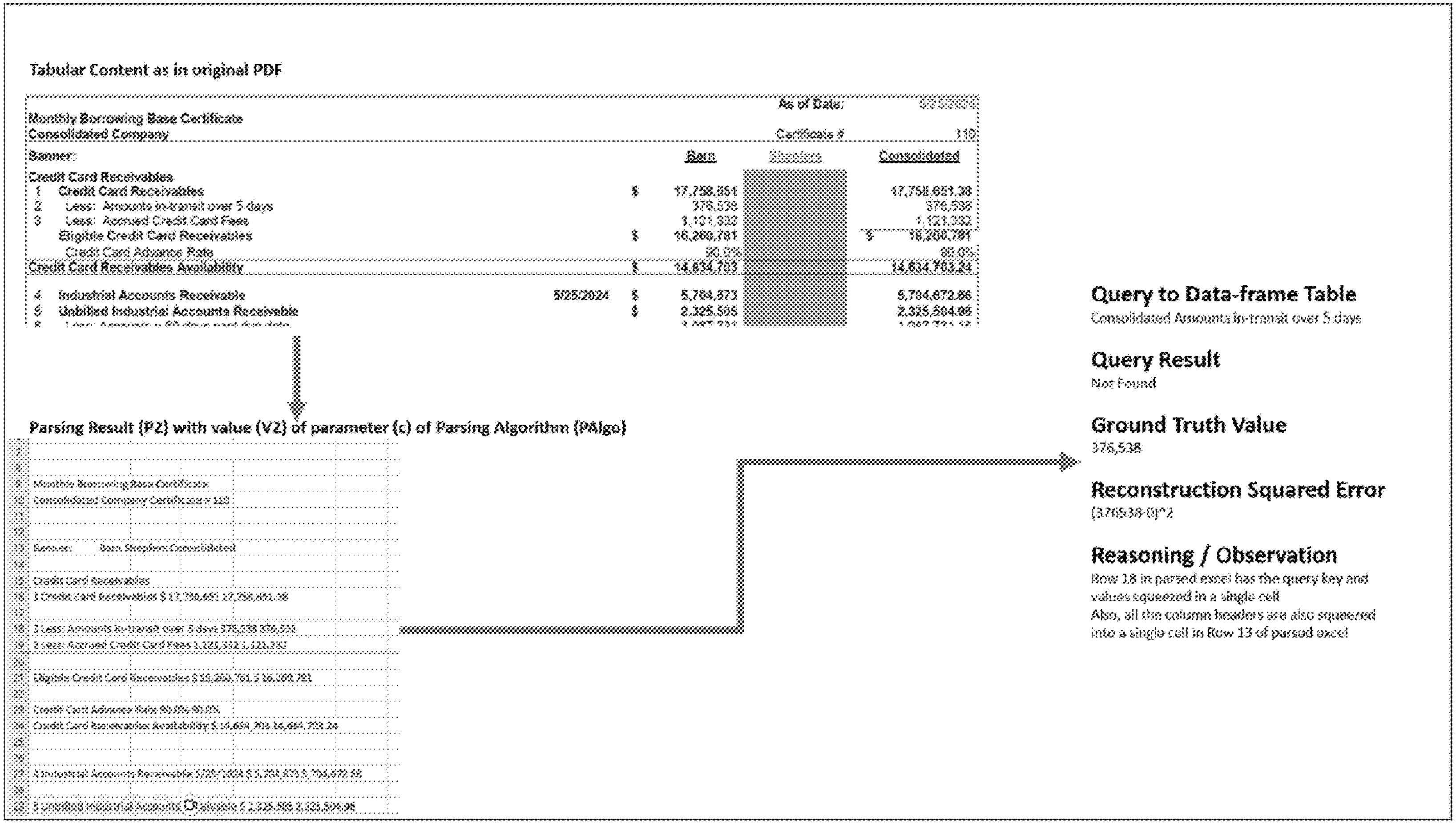
Figure 7C:
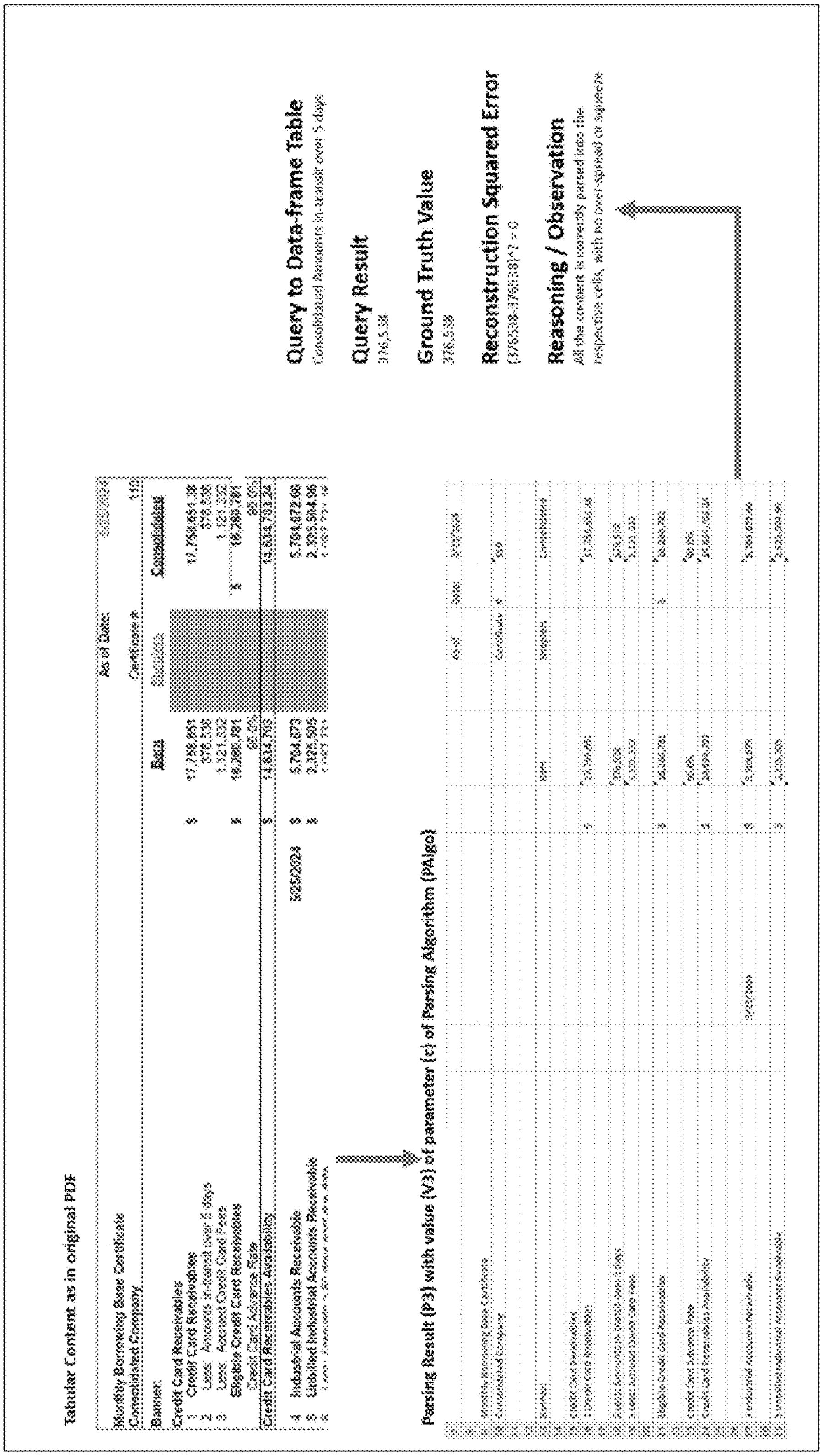

FIGS. 7A-7E illustrates example images of the operation and outcomes of the optimization algorithm. Towards the initial epochs of the optimization runs the contents of the reconstructed tables may be either too spread out or too squeezed up. In FIGS. 7A-7C, this can be seen in the illustrations 700A, 700B, and 700C with extraction outcomes P1 and P2 respectively, where the values of extraction parameter 'c' are V1 and V2, respectively. In such a scenario, it can be observed that the reconstruction mean square error value is high.

With this, as the optimization keeps progressing, eventually the algorithm converges the value of parameter 'c' to V3, where the extraction result P3 is received, with the reconstruction mean square error as 0.

As shown in FIGS. 7A-7C, the reconstruction squared error is the error value for a single Question-Answer pair. This value is averaged across all the Question-Answer pairs in the entire document, which gives the final reconstruction mean squared error value.

FIG. 7D shows a sample illustration 700D of the reconstruction squared error and the reconstruction mean squared error.

Figure 7E:
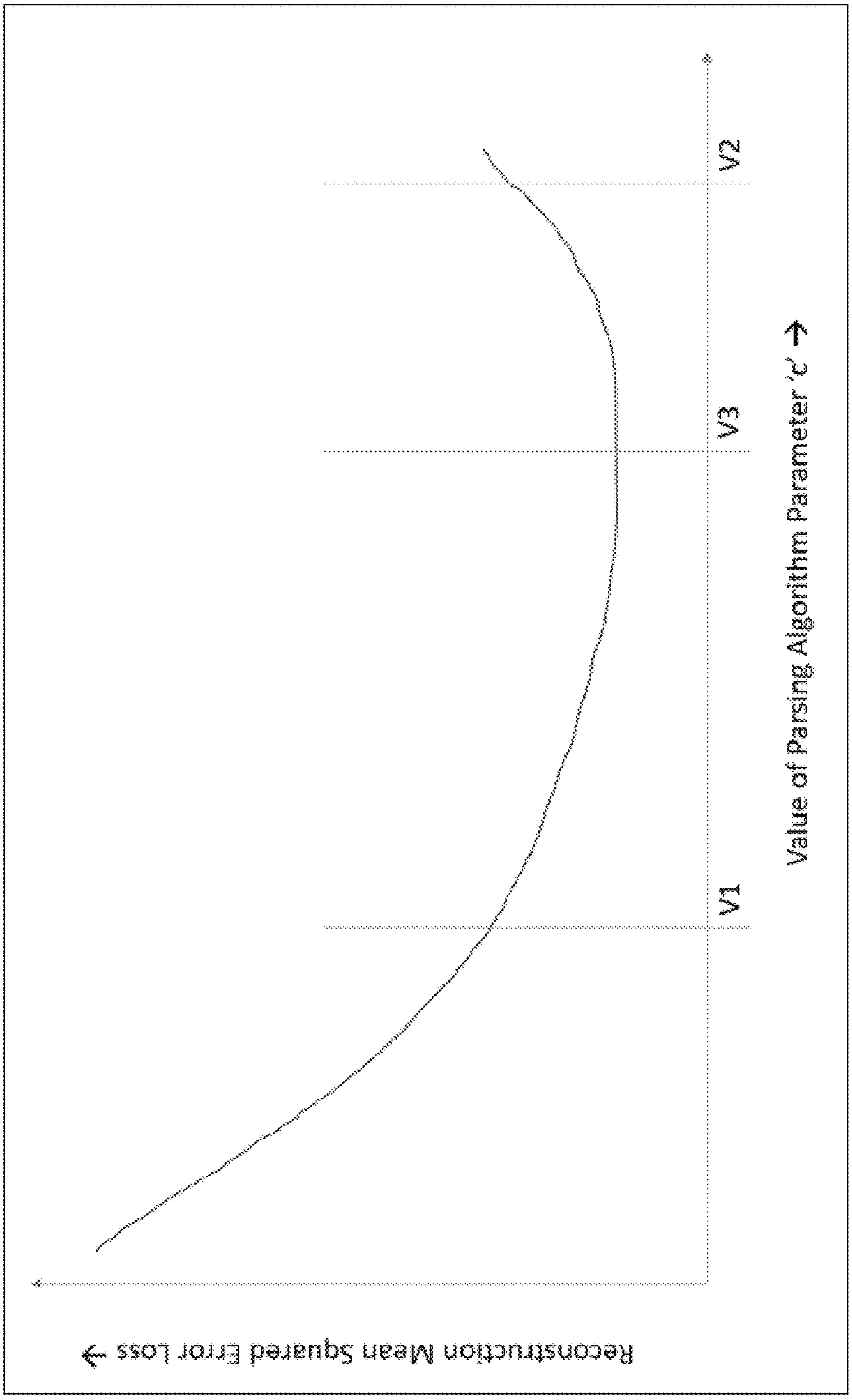

FIG. 7E is a graph 700E showing the reconstruction error minimization by optimization. The value of 'c' may be updated in the direction of minimization of reconstruction mean squared error loss value.

A learning rate value 'α' (0<α<1) may be used to revise the 'c' value in a controlled manner over a number of epochs Mathematical Formulation:

$$c_{i+1} = c_i - \alpha\frac{\partial E}{\partial c}$$

Where, i: Number of current epoch ci+1: New value of the parameter 'c' for next i.e., 'i+1'$^{st}$ epoch ci: Value of the parameter 'c' for current 'i'$^{th}$ epoch α: Learning Rate (0<α<1)

E: Reconstruction Mean Squared Error Function $$\alpha\frac{\partial E}{\partial c}:$$

Gradient of Error Function with respect to parameter 'c'

Returning to FIG. 2, at block 232, the process may use the synthetic data generator to create additional data fields from the same PDF and/or other past PDFs to mimic the correct data distribution and generate incorrect (negative) information. This combination of ground truth and synthetic data may be used to train the surrogate model 140. The synthetic data generator may ensure a diverse and comprehensive dataset for training, improving the model's robustness. The synthetic data generator may interact with the ground truth extraction and the adaptive learner to provide the necessary data for retraining the models.

At block 234, the process may use the adaptive learner to continuously adapt the entire framework to new data, ensuring minimal human intervention. The adaptive learner may monitor the performance of the models and trigger retraining when high reconstruction loss is detected. The adaptive learner may receive more synthetic data from the synthetic data generator and instruct the primary LLM module 138 to generate better ground truth data for problematic samples. The adaptive learner may retrain the surrogate model 140 on the new data, ensuring the system remains accurate and reliable over time. The adaptive learner may interact with the error correction module, the synthetic data generator, and the primary LLM module 138 to maintain the system's performance and adaptability.

At block 236, the process may use the monitoring module, which may be a component of the adaptive learner, to keep track of the performance of the models and the overall framework. Monitoring may ensure that the accuracy and confidence levels of the extracted data are maintained over time. Monitoring may trigger alerts and initiate retraining processes when significant deviations in performance are detected. The monitoring component may interact with the adaptive learner to ensure continuous improvement and adaptation of the framework.

Embodiments of the present disclosure may provide numerous advantages that significantly enhance the extraction and reconstruction of tabular data from PDFs, as well as the confidence estimation of responses generated by LLMs. These advantages are as follows.

In an embodiment, the document analysis system and method may provide versatility across various types of PDFs. The document analysis system and method may be configured to operate on a wide range of PDF documents, including scanned PDFs, searchable PDFs, and PDFs containing both borderless and bordered tables. This versatility ensures its applicability across diverse document types without any restrictions on the nature of the PDF documents.

In an embodiment, the document analysis system and method may provide the elimination of manual parameter optimization. By employing an optimization technique, the document analysis system and method may eliminate the need for human intervention to manually experiment with and adjust extraction algorithm parameters for each new document template. This automation may significantly enhance efficiency and may be particularly beneficial for applications involving high volumes, high complexity, and highly variable documents.

In an embodiment, the document analysis system and method may provide preservation of syntactical and structural integrity. Embodiments of the document analysis system and method may focus on minimizing the "reconstruction error" for tabular content. As a result, the final parsed document may retain the syntactical and structural relationships present in the original tabular content, ensuring high fidelity in data representation.

In an embodiment, the document analysis system and method may facilitate the usage of conventional data extraction techniques. By maintaining the syntactical and structural relationships in the final parsed document, the document analysis system and method may enable the use of conventional SQL-like approaches for Q&A and information extraction tasks. This obviates the need for advanced techniques to extract information from each document, simplifying the data extraction process.

In an embodiment, the document analysis system and method may provide the simplification of information extraction. The document analysis system and method may effectively translate the complex problem of information extraction from intricate documents into a straightforward task of table querying. This simplification enhances the ease and efficiency of data retrieval operations.

In an embodiment, the document analysis system and method may provide an economical use of LLMs. The document analysis system and method may leverage LLMs as a one-time activity, making it a cost-effective solution for Q&A and similar document information extraction use cases at any scale. This economical approach ensures broad accessibility and feasibility in various applications.

In an embodiment, the document analysis system and method may provide flexibility with extraction algorithms. The document analysis system and method are not limited to the use of a specific extraction algorithm. Instead, it may offer a plug-and-play framework, allowing for the easy adoption and integration of various extraction algorithms as per the application's requirements.

In an embodiment, the document analysis system and method may provide flexibility with LLMs. Similarly, document analysis systems and methods are not limited to the use of a specific LLM. The document analysis system and method may provide a plug-and-play framework, making it adaptable for different LLMs, thereby enhancing its applicability across a wide range of use cases.

In an embodiment, the document analysis system and method may provide automation of parameter optimization. The optimization technique may automate the determination of optimal parameter values for any given extraction algorithm. This may be particularly valuable for high-volume, high-complexity, and highly variable document processing scenarios, where manual parameter tuning would be impractical and time-consuming.

In an embodiment, the document analysis system and method may provide a reduction in human intervention. The document analysis system and method's ability to automate the entire extraction process significantly reduces the need for human intervention. This may lead to higher efficiency and consistency in extraction operations and also minimize the potential for human errors.

In an embodiment, the document analysis system and method may provide an enhanced scalability and replicability. The document analysis system and method may be highly scalable and replicable, constrained only by the computing and memory capacity of the host machine. Enhanced computational power and parallelization capabilities may lead to more efficient exploration of the sample space and quicker identification of the optimal extraction.

In an embodiment, the document analysis system and method may provide a cost-effective solution. By requiring only, a single access to an LLM and avoiding expensive vision-based technologies, the document analysis system and method may offer a cost-effective solution. This affordability makes it accessible and easy to implement across various industries and applications.

In an embodiment, the document analysis system and method may provide simplified information retrieval. The retention of original syntactical and structural relationships in the parsed document allows for straightforward information retrieval using conventional querying techniques. This simplifies the process of extracting information, making it more user-friendly and efficient. In an embodiment, the document analysis system and method may provide broad applicability. The document analysis system and method's versatility, cost-effectiveness, and automation capabilities make it suitable for a wide range of industrial applications, including but not limited to, financial document processing, legal document analysis, and academic research.

In an embodiment, the document analysis system and method may provide improved efficiency. By automating the extraction process and minimizing reconstruction errors, the document analysis system and method may significantly improve the efficiency of data extraction and processing. This may lead to faster turnaround times and improved productivity in document-handling tasks.

In an embodiment, the document analysis system and method may provide a standardized evaluation. The surrogate model may standardize the evaluation process by providing a consistent and systematic method to assess the confidence in the answers extracted by the original model. This ensures uniformity and repeatability in confidence estimation across different datasets and use cases.

In an embodiment, the document analysis system and method may provide comprehensive assessments. The dual-model architecture may enable a thorough assessment of the extracted answers. By leveraging both the original and surrogate models, the document analysis system and method may ensure that each answer undergoes rigorous evaluation, considering multiple factors before assigning a confidence score.

In an embodiment, the document analysis system and method may provide contextual and semantic analysis. The use of transformer-based models for embedding generation allows for deep contextual and semantic analysis of the table, questions, and answers. This ensures that the confidence estimation is based on a nuanced understanding of the data, leading to more accurate and reliable results.

In an embodiment, the document analysis system and method may provide positive and negative connotation assessments. The generation of positive and negative samples, including simulated hallucinatory behavior, allows the surrogate model to learn and differentiate between correct and incorrect answers effectively. This reduces the likelihood of overestimating confidence in incorrect answers and appropriately flags potential errors.

In an embodiment, the document analysis system and method may provide alignments with user expectations. By providing accurate confidence estimates, the document analysis system and method may align with user expectations for reliable and trustworthy data extraction. Users may make informed decisions based on the confidence scores, enhancing their overall experience and trust in the system.

The list of advantages described above is not exhaustive and other possibilities are also compatible with the present disclosure. Many features and advantages of the present disclosure are disclosed in the detailed specification.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually, and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative and not restrictive, and the appended claims are intended to cover all such modifications, enhancements, and other embodiments that fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A computer-implemented method comprising:

receiving one or more PDF documents by a self-correcting artificial intelligence (AI) framework for extracting and validating tabular data from the PDF documents;

extracting and reconstructing the tabular data in a format as extracted data from the PDF documents into a structured dataframe using a data extractor module;

validating the extracted data by querying the structured dataframe using a comparator module, wherein the comparator module compares the extracted data against predefined criteria and generates a reconstruction loss calculation;

adjusting parameters of the data extractor module based on the reconstruction loss calculation using an error correction module, wherein the error correction module iteratively minimizes the reconstruction loss;

continuously adapting the framework to new data using an adaptive learner module, wherein the adaptive learner module monitors the performance of a dual-model architecture and triggers retraining when a high reconstruction loss is detected, and wherein the dual-model architecture comprises a primary large language model (LLM) module and a secondary model;

generating ground truth data and synthetic data using the primary LLM module and a synthetic data generator module, wherein the ground truth data and synthetic data are used to train the secondary model;

determining a confidence level of the extracted data using the secondary model; and outputting final extracted data of the data extraction module after validation and error correction processes, ensuring the final extracted data accurately represents an original format of the tabular content of the PDF documents.

2. The method of claim 1, wherein the data extractor module employs a parameter-based data extraction algorithm to read bounding box information from the PDF documents.

3. The method of claim 2, wherein the data extractor module processes both searchable and scanned PDF documents, wherein the data extractor module processes the scanned PDF documents using OCR technology to extract the tabular content of the PDF documents.

4. The method of claim 1, wherein the data extractor module employs a column clustering algorithm to ensure proper column alignment in an EXCEL file.

5. The method of claim 4, wherein the column clustering algorithm calculates a content density of each column to ensure proper alignment in the EXCEL file.

6. The method of claim 1, wherein the comparator module includes a reconstruction loss calculation to measure accuracy of the extracted data.

7. The method of claim 6, wherein the reconstruction loss calculation is based on a loss function that compares ground truth answers and the confidence level of the extracted data;

and wherein the error correction module constructs a sample space from the extracted data to identify the extracted data that minimizes the loss function.

8. The method of claim 7, wherein the synthetic data generator module creates additional data fields from the same PDF and/or other past PDFs to mimic a correct data distribution and generate incorrect information for training the secondary model.

9. The method of claim 7, wherein the secondary model evaluates question, value, and context variables to provide a probabilistic confidence outcome representing a confidence in a correctness of the ground truth answers.

10. The method of claim 1, wherein the primary LLM module generates both correct (positive) and incorrect (negative) question-answer pairs from the tabular data in the PDF document to simulate hallucinatory behavior to mitigate hallucinatory responses.

11. The method of claim 1, wherein the error correction module operates in a gradient descent manner to iteratively minimize the reconstruction loss.

12. A system comprising:

a self-correcting artificial intelligence (AI) framework configured to receive one or more PDF documents for extracting and validating tabular data from the PDF documents;

a data extractor module configured to extract and reconstruct the tabular data into a structured dataframe using a parameter-based data extraction algorithm;

a comparator module configured to validate the extracted data by querying the structured dataframe and comparing the extracted data against predefined criteria, generating a reconstruction loss calculation;

an error correction module configured to adjust parameters of the data extractor module based on the reconstruction loss calculation, iteratively minimizing the reconstruction loss;

an adaptive learner module configured to continuously adapt the apparatus to new data by monitoring the performance of a dual-model architecture and triggering retraining when a high reconstruction loss is detected, wherein the dual-model architecture comprises a primary large language model (LLM) module and a secondary model;

wherein the primary LLM module is configured to generate ground truth data and use a synthetic data generator module to generate synthetic data, wherein the ground truth data and the synthetic data are used to train the secondary model;

wherein the secondary model is configured to determine a confidence level of the extracted data;

wherein the data extractor module employs a column clustering algorithm to ensure proper column alignment in the extracted data; and wherein the framework outputs final extracted data after validation and error correction processes, ensuring the final extracted data accurately represents an original format of the tabular content of the PDF documents.

13. The system of claim 12, wherein the data extractor module employs a parameter-based data extraction algorithm to read bounding box information from the PDF documents.

14. The system of claim 13, wherein the data extractor module processes both searchable and scanned PDF documents, wherein the data extractor module processes the scanned PDF documents using OCR technology to extract the tabular content of the PDF documents.

15. The system of claim 12, wherein the data extractor module employs a column clustering algorithm to ensure proper column alignment in an EXCEL file; and wherein the column clustering algorithm calculates a content density of each column to ensure proper alignment in the EXCEL file.

16. The system of claim 12, wherein the comparator module includes a reconstruction loss calculation to measure accuracy of the extracted data.

17. The system of claim 16, wherein the reconstruction loss calculation is based on a loss function that compares ground truth answers and the confidence level of the extracted data; and wherein the error correction module constructs a sample space from the extracted data to identify the extracted data that minimizes the loss function.

18. The system of claim 17, wherein the secondary model evaluates question, value, and context variables to provide a probabilistic confidence outcome representing a confidence in a correctness of the ground truth answers.

19. The system of claim 12, wherein the primary LLM module generates both correct (positive) and incorrect (negative) question-answer pairs from the tabular data in the PDF document to simulate hallucinatory behavior to mitigate hallucinatory responses.

20. A non-transitory computer-readable storage medium storing instructions that when executed by a computer cause the computer to perform a method comprising:

receiving one or more PDF documents by a self-correcting artificial intelligence (AI) framework for extracting and validating tabular data from the PDF documents;

extracting and reconstructing the tabular data in a format as extracted data from the PDF documents into a structured dataframe using a data extractor module;

validating the extracted data by querying the structured dataframe using a comparator module, wherein the comparator module compares the extracted data against predefined criteria and generates a reconstruction loss calculation;

adjusting parameters of the data extractor module based on the reconstruction loss calculation using an error correction module, wherein the error correction module iteratively minimizes the reconstruction loss;

continuously adapting the framework to new data using an adaptive learner module, wherein the adaptive learner module monitors the performance of a dual-model architecture and triggers retraining when a high reconstruction loss is detected, and wherein the dual-model architecture comprises a primary large language model (LLM) module and a secondary model;

generating ground truth data and synthetic data using the primary LLM module and a synthetic data generator module, wherein the ground truth data and synthetic data are used to train the secondary model;

determining a confidence level of the extracted data using the secondary model; and outputting final extracted data of the data extraction module after validation and error correction processes, ensuring the final extracted data accurately represents an original format of the tabular content of the PDF documents.

* * * * *